(12) United States Patent
Nomura et al.

(10) Patent No.: US 8,687,263 B2
(45) Date of Patent: Apr. 1, 2014

(54) LIGHT CONTROL FILM

(75) Inventors: Satoyuki Nomura, Tsukuba (JP); Yoshii Morishita, Tsukuba (JP); Tooru Tanaka, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/148,962

(22) PCT Filed: Feb. 9, 2010

(86) PCT No.: PCT/JP2010/051891
§ 371 (c)(1),
(2), (4) Date: Aug. 11, 2011

(87) PCT Pub. No.: WO2010/092953
PCT Pub. Date: Aug. 19, 2010

(65) Prior Publication Data
US 2011/0310464 A1     Dec. 22, 2011

(30) Foreign Application Priority Data

Feb. 13, 2009   (JP) .............................. P2009-031211

(51) Int. Cl.
*G02B 26/00*        (2006.01)
(52) U.S. Cl.
USPC ........................................... 359/296; 430/32
(58) Field of Classification Search
USPC .............. 359/296; 345/107; 430/32; 204/600
See application file for complete search history.

(56) References Cited

U.S. PATENT DOCUMENTS

| | | | |
|---|---|---|---|
| 1,955,923 A | 4/1934 | Land |
| 1,963,496 A | 6/1934 | Land |
| 2,041,138 A | 5/1936 | Land |
| 2,306,108 A | 12/1942 | Land |
| 2,375,963 A | 5/1945 | Thomas |

(Continued)

FOREIGN PATENT DOCUMENTS

| | | |
|---|---|---|
| GB | 433455 | 8/1935 |
| JP | 58-116517 | 7/1983 |

(Continued)

OTHER PUBLICATIONS

English translation of International Preliminary Examination Report on Patentability dated Sep. 22, 2011.

(Continued)

*Primary Examiner* — Stephone B. Allen
*Assistant Examiner* — James McGee
(74) *Attorney, Agent, or Firm* — Antonelli, Terry, Stout & Kraus, LLP.

(57) ABSTRACT

A light control film includes two transparent electroconductive resin substrates each having a transparent electroconductive film and a transparent resin substrate; and a light control layer sandwiched between the transparent electroconductive film sides of the two transparent electroconductive resin substrates. The transparent electroconductive film of one transparent electroconductive resin substrate having a primer layer is cut through a cutting line to have a shape of a picture or character, and the cutting line is in a form that a start point for the cutting and an end point for the cutting make a closed region. The closed region of the picture of character is electrically insulated from the transparent electroconductive film around the shape of the picture or character. The light control film enables to improve adhesiveness between film matrix and substrates and to provide stable control function.

4 Claims, 8 Drawing Sheets

(56) References Cited

U.S. PATENT DOCUMENTS

| | | |
|---|---|---|
| 3,756,700 A | 9/1973 | Saxe |
| 3,912,365 A | 10/1975 | Lowell |
| 4,078,856 A | 3/1978 | Thompson et al. |
| 4,247,175 A | 1/1981 | Saxe |
| 4,270,841 A | 6/1981 | Saxe |
| 4,273,422 A | 6/1981 | Saxe |
| 4,407,565 A | 10/1983 | Saxe |
| 4,422,963 A | 12/1983 | Thompson et al. |
| 6,271,956 B1 | 8/2001 | Saxe et al. |
| 6,480,322 B2 * | 11/2002 | Engler et al. .................. 359/296 |
| 6,987,602 B2 * | 1/2006 | Saxe ............................. 359/296 |

FOREIGN PATENT DOCUMENTS

| | | |
|---|---|---|
| JP | 64-51916 | 3/1989 |
| JP | 05-27271 | 2/1993 |
| JP | 2002-181923 | 7/2002 |
| JP | 2003-525468 | 8/2003 |
| JP | 2008-158043 | 7/2008 |
| WO | WO 01/65299 A1 | 9/2001 |

OTHER PUBLICATIONS

JP Office Action of Appln. No. 2010-550520 dated May 7, 2013 with English translation.

JP Office Action of JP Appln. No. 2010-550520 dated Jan. 7, 2014 with English translation.

* cited by examiner (a) (b)

(a)

(b)

(c)

(a)

(b)

(c)

(a)

(b)

(c)

(a)

(b)

(c)

(a)

(b)

(c)

LIGHT CONTROL FILM

TECHNICAL FIELD

The present invention relates to a light control film having a light control function.

BACKGROUND ART

A light control glass containing a light control suspension was first invented by Edwin Land. The form thereof has a structure wherein a light control suspension in a liquid state is injected between two transparent electroconductive substrates having a narrow gap (see, for example, Patent Documents 1 and 2). According to Edwin Land's invention, in the state that no electric field is applied to the liquid light control suspension, which is injected between the two transparent electroconductive substrates, the great majority of incident light is reflected, scattered or absorbed on/in the light control particles dispersed in the suspension by Brownian movement of the light control particles. Only a very small portion of the light is transmitted therethrough.

In other words, the degree of the transmission, reflection, scattering or absorption is decided in accordance with the shape, nature and concentration of the light control particles dispersed in the light control suspension, and the energy quantity of the radiated light. When an electric field is applied to a light control window wherein light control glass having the above-mentioned structure is used, an electric field is formed in the light control suspension via the transparent electroconductive substrates. The light control particles, which show a light control function, are polarized so that the particles are arranged in parallel to the electric field. As a result, light is transmitted between the light control particles. Finally, the light control glass turns transparent. However, such an initial light control device has not easily been put into practice use because of the aggregation of the light control particles in the light control suspension, the sedimentation thereof based on the weight of the particles themselves, a change in the color phase on the basis of heat, a change in the optical density, a deterioration based on the radiation of ultraviolet rays, difficulties in the maintenance of the gap between the substrates and in the injection of the light control suspension into the gap, and others.

Robert L. Saxe, F. C. Lowell or R. I. Thompson discloses a light control window using a light control glass which compensates for problems of initial light control windows, that is, the aggregation and the sedimentation of light control particles, a change in the optical density, and others (see, for example, Patent Documents 3 to 9). According to these patents and others, use is made of a liquid-state light control suspension composed of light control crystal particles in a needle form, a suspending agent for dispersing the crystal particles, a dispersion adjustor, a stabilizer and others to make the density of the light control particles substantially equal to that of the suspending agent, whereby the sedimentation of the light control particles is prevented while the addition of the dispersion adjustor makes the dispersibility of the light control particles high. In this way, the aggregation of the light control particles is prevented so that the initial problems are solved.

However, the light control glass has a structure wherein a light control suspension in a liquid state is sealed into a gap between two transparent electroconductive substrates, similarly to any conventional light control glass; thus, when a large-size product is produced, it is difficult to seal the suspension evenly into the gap between the two transparent electroconductive substrates, so that there remains a problem that a difference in hydraulic pressure between the upper and lower regions of the product easily causes an expansion phenomenon of the lower region. Additionally, in accordance with the external environment, for example, the pressure of wind, the gap between the substrates is changed, so that the following problem is caused: the optical density is changed so that the color phase becomes uneven; or a sealing member, in the surroundings, for storing liquid between the transparent electroconductive substrates is broken so that the light control material leaks. Moreover, the response time becomes uneven by a deterioration based on ultraviolet rays, or a drop in the voltage between the circumferential region and the center region, of the transparent electroconductive substrates.

As a method for improving the above, suggested is a method of mixing a liquid light control suspension with a solution of a curable polymeric resin, and using a phase-separation method by polymerization, a phase-separation method by solvent-volatilization, a phase-separation method depending on temperature, or some other method to produce a film (see, for example, Patent Document 10).

PRIOR ART DOCUMENTS

Patent Documents

Patent Document 1: U.S. Pat. No. 1,955,923
Patent Document 2: U.S. Pat. No. 1,963,496
Patent Document 3: U.S. Pat. No. 3,756,700
Patent Document 4: U.S. Pat. No. 4,247,175
Patent Document 5: U.S. Pat. No. 4,273,422
Patent Document 6: U.S. Pat. No. 4,407,565
Patent Document 7: U.S. Pat. No. 4,422,963
Patent Document 8: U.S. Pat. No. 3,912,365
Patent Document 9: U.S. Pat. No. 4,078,856
Patent Document 10: JP-A-2002-189123

DISCLOSURE OF THE INVENTION

Technical Problem

In any conventional light control glass, the light transmittance of the whole of the light control glass is varied when an electric field is applied thereto. Thus, it is difficult to vary the light transmittance of only one region of the light control glass from that of the other region, or vary the light transmittance of a region thereof having a design such as a character or picture, from that of the other region.

In the case of attempting to vary the light transmittance of only one region (of the light control glass) from that of the other region, or vary the light transmittance of a region thereof having a design such as a character or picture, from that of the other region, it is necessary to pattern the transparent electroconductive substrates in advance. It is therefore difficult to vary the light transmittance of the region having the design such as the character or picture, easily and freely from that of the other region.

Furthermore, about the polymeric resin, which is to be cured to become a film matrix, the molecule thereof is not designed considering the adhesiveness to any transparent electroconductive substrate. Thus, poor is the adhesiveness between the film matrix and substrates such as PET films each having a surface on which an electroconductive thin film made of ITO or the like is formed, so that there remains a problem that the film matrix is very easily peeled from the substrates.

An object of the invention is to provide a light control film in which the light transmittance of only one region of its light control glass can easily be varied from that of the other region, or the light transmittance of a region having a design such as a character or picture, is varied from that of the other region.

Solution to Problem

The inventors have made eager investigations to find out that the above-mentioned problems can be solved by forming a primer layer on at least one of two transparent electroconductive resin substrates, making a cutting line for a picture, a character or the like in a transparent electroconductive film of the one transparent electroconductive resin substrate having the primer layer, and making a closed region with closing a start point for the cutting and an end point for the cutting, thereby insulating the closed region of the picture or character electrically from the surrounding region of the transparent electroconductive film of the transparent electroconductive resin substrate.

Accordingly, the invention relates to a light control film, comprising: two transparent electroconductive resin substrates each having a transparent electroconductive film and a transparent resin substrate; and a light control layer sandwiched between the transparent electroconductive film sides of the two transparent electroconductive resin substrates, the light control layer containing: a resin matrix; and a light control suspension dispersed in the resin matrix, wherein at least one of the two transparent electroconductive resin substrates has, on the transparent electroconductive film side thereof, a primer layer, the transparent electroconductive film of the one transparent electroconductive resin substrate having the primer layer, is cut through a cutting line to have a shape of a picture or character, the cutting line is in a form that a start point for the cutting and an end point for the cutting make a closed region, and the closed region of the picture of character is electrically insulated from the transparent electroconductive film around the shape of the picture or character.

The invention also relates to a light control film, comprising: two transparent electroconductive resin substrates each having a transparent electroconductive film and a transparent resin substrate; and a light control layer sandwiched between the transparent electroconductive film sides of the two transparent electroconductive resin substrates, the light control layer containing: a resin matrix; and a light control suspension dispersed in the resin matrix, wherein at least one of the two transparent electroconductive resin substrates has, on the transparent electroconductive film side thereof, a primer layer, the transparent electroconductive film and the transparent resin substrate of the one transparent electroconductive resin substrate having the primer layer, are cut through a cutting line to have a shape of a picture or character, the cutting line is in a form that a start point for the cutting and an end point for the cutting make a closed region, and the closed region of the picture of character is electrically insulated from the transparent electroconductive film of the transparent electroconductive resin substrate around the shape of the picture or character.

The invention also relates to a light control film, comprising: two transparent electroconductive resin substrates each having a transparent electroconductive film and a transparent resin substrate; and a light control layer sandwiched between the transparent electroconductive film sides of the two transparent electroconductive resin substrates, the light control layer containing: a resin matrix; and a light control suspension dispersed in the resin matrix, wherein at least one of the two transparent electroconductive resin substrates has, on the transparent electroconductive film side thereof, a primer layer, the transparent electroconductive film and the primer layer of the one transparent electroconductive resin substrate having the primer layer, are cut through a cutting line to have a shape of a picture or character, the cutting line is in a form that a start point for the cutting and an end point for the cutting make a closed region, and the closed region of the picture of character is electrically insulated from the transparent electroconductive film of the transparent electroconductive resin substrate around the shape of the picture or character.

It is preferred in the light control film of the invention that the cutting line is made by use of a cutting plotter.

Advantageous Effects of the Invention

In the light control film of the invention, the light transmittance of only one region thereof can be varied from that of the other region, or the light transmittance of a region thereof having a design such as a character or picture, can be varied from that of the other region.

The disclosure of the present application is related to the subject matters described in Japanese Patent Application No. 2009-31211 filed on Feb. 13, 2009, and the contents disclosed therein are incorporated herein by reference.

BEST MODES FOR CARRYING OUT THE INVENTION

Figure 1:
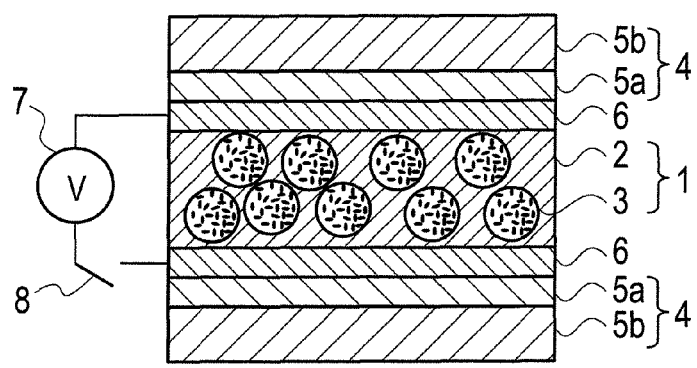
FIG. 1 is a schematic view of a sectional structure of an embodiment of the light control film of the invention.

The light control film of the invention is a light control film comprising: two transparent electroconductive resin substrates each having a transparent electroconductive film and a transparent resin substrate; and a light control layer sandwiched between the transparent electroconductive film sides of the two transparent electroconductive resin substrates, the light control layer containing: a resin matrix; and a light control suspension dispersed in the resin matrix, wherein at least one of the two transparent electroconductive resin substrates has, on the transparent electroconductive film side thereof, a primer layer, (1) the transparent electroconductive film of the one transparent electroconductive resin substrate having the primer layer, (2) the transparent electroconductive film and the transparent resin substrate of the one transparent electroconductive resin substrate having the primer layer, or (3) the electroconductive film and the primer layer of the one transparent electroconductive resin substrate having the primer layer, are cut through a cutting line to have a shape of a picture or character, the cutting line is in a form that a start point for the cutting and an end point for the cutting make a closed region, and the closed region of the picture of character is electrically insulated from the transparent electroconductive film of the transparent electroconductive resin substrate around the shape of the picture or character.

In the invention, the wording "the cutting line is in a form that a start point for the cutting and an end point for the cutting make a closed region" means a form which is obtained by a matter that the cutting start point and the cutting end point are consistent with each other so as to form a two-dimensionally closed region such as a circle, an ellipse, or a polygon.

In order to vary the light transmittance of a picture- or character-shape region of a transparent electroconductive film of a transparent electroconductive resin substrate from the other region thereof, it is sufficient that the transparent electroconductive film of the transparent electroconductive resin substrate is cut through a cutting line to have the picture or character shape and further the cutting line is made into a closed form that a start point for the cutting and an end point therefor make a closed region to insulate the picture- or character-shape region electrically from the surrounding region of the transparent electroconductive film of the transparent electroconductive resin substrate.

As described above, in the invention, this is attained as follows: (1) only the transparent electroconductive film of the above-mentioned one transparent electroconductive resin substrate having the primer layer, is cut through a cutting line; (2) the transparent electroconductive film and the transparent resin substrate of the one transparent electroconductive resin substrate having the primer layer, are cut through a cutting line; or (3) the transparent electroconductive film and the primer layer of the one transparent electroconductive resin substrate having the primer layer, are cut through a cutting line.

The light control layer can be generally formed by use of a light control material. The light control material in the invention contains the following: a polymeric medium that is irradiated with an energy ray to be cured, as a resin matrix; and a light control suspension wherein light control particles are dispersed in a dispersing medium in the state that the particles can flow. It is preferred that the dispersing medium in the light control suspension can undergo phase separation from the polymeric medium and a cured product thereof.

The light control material is used to sandwich the light control layer, in which the light control suspension is dispersed in the resin matrix made of the polymeric medium, between the two transparent electroconductive resin substrates, or other members. At this time, it is important that one of the transparent electroconductive resin substrates has, on the transparent electroconductive film side thereof, a primer layer in order to improve the adhesiveness between the transparent electroconductive film and the light control layer. Only in the transparent electroconductive film of the one transparent electroconductive resin substrate having the primer layer, a cutting line is made to have a picture or character shape, or some other shape, and further the cutting line is made into a form that a start point for the cutting and an end point for the cutting make a closed region, thereby yielding the light control film of the invention, in which the picture or character region is electrically insulated from the surrounding region of the transparent electroconductive film of the transparent electroconductive resin substrate, so that the light transmittance of only one region is varied from that of the other region, or the light transmittance of the region having the design such as the picture or character, is varied from that of the other region.

It is preferred for the adhesiveness that a primer layer is formed on each of the two transparent electroconductive resin substrates. However, a cutting line having a shape of a picture, a character or some other is made only in the transparent electroconductive film of one of the transparent electroconductive resin substrates.

In the light control layer of the light control film of the invention, a liquid light control suspension is dispersed in the form of fine droplets in a solid resin matrix wherein a polymeric medium is cured. Light control particles contained in the light control suspension are preferably in a rod or needle form. Details thereof will be described later.

When an electric field is applied to this light control film, the light control particles, which have electrical dipole moment and are floated and dispersed in the liquid droplets of the light control suspension dispersed in the resin matrix, are arranged, in parallel to the electric field, only in their electrically connected regions. In this way, the liquid droplets are turned into a state transparent to incident light. Thus, the incident light is transmitted in the state that scattering in accordance with the viewing angle or a decrease in transparency is hardly caused.

In the invention, a cutting line is made only in the transparent electroconductive film of the one transparent electroconductive resin substrate having the primer layer, to have a picture or character shape or some other shape, and further the cutting line is in a form that a start point for the cutting and an end point for the cutting make a closed region. The picture or character region is electrically insulated from the surrounding region of the transparent electroconductive film of the transparent electroconductive resin substrate, thereby solving the problem in any light control film in the prior art, that is, a problem that it is difficult to vary the light transmittance of only one region thereof.

Main examples of the manner of making the cutting line in the transparent electroconductive film of the transparent electroconductive resin substrate to have the picture or character shape or some other shape, thereby insulating the picture or character region electrically from the picture- or character-surrounding or the other-surrounding region of the transparent electroconductive film, include the following three:

(1) only the transparent electroconductive film of the one transparent electroconductive resin substrate having the primer layer, is cut through the cutting line, (2) the transparent electroconductive film and the transparent resin substrate of the one transparent electroconductive resin substrate having the primer layer, are cut through the cutting line, and (3) the transparent electroconductive film and the primer layer of the one transparent electroconductive resin substrate having the primer layer, are cut through the cutting line.

The manner (1) is specifically a manner of making the cutting line to cut the transparent electroconductive film of the transparent electroconductive resin substrate completely, and then forming the primer layer.

The manner (2) is specifically a manner of making the cutting line from the transparent resin substrate side of the transparent electroconductive resin substrate toward the inner side, in which the transparent electroconductive film is formed, so as to cut the transparent electroconductive film completely. The cutting line is made from the transparent resin substrate side of the transparent electroconductive resin substrate to the transparent electroconductive film without especial restriction in the production of the light control film. The manner therefor is, for example, a manner making the cutting line from the transparent resin substrate side toward the transparent electroconductive film after forming a transparent electroconductive film onto a substrate to prepare a transparent electroconductive resin substrate, or after forming alight control film. The cutting line is preferably made after the formation of the light control film since it can be carried out by a user after the light control film is supplied into a roll form.

The manner (3) is specifically a manner of making the cutting line from the side of the primer layer formed on the transparent electroconductive film of the transparent electroconductive resin substrate, so as to cut the transparent electroconductive film completely. The manner for making the cutting line from the primer layer to the transparent electroconductive film is, for example, a manner of forming a transparent electroconductive film onto a transparent resin substrate to prepare a transparent electroconductive resin substrate, further forming a primer layer thereon, and subsequently cutting the resultant from the primer layer side toward the transparent electroconductive film.

In the invention, the cutting line is made in the transparent electroconductive film without any especial restriction as far as the cutting line can be given into the transparent electroconductive film. A preferred example of the manner therefor is a manner of using a cutting plotter to make a cutting line for a picture or character. A manner of using a laser cutter to make a cutting line is also preferred.

The following will describe the structure of each of the layers of the light control film of the invention.

<Primer Layer>

It is important that the film has, on one or each of its transparent electroconductive films, a primer layer. First, a description is made about the primer layer in the invention.

The primer layer in the invention is not particularly limited as far as the layer makes good the adhesiveness between the light control layer and the transparent electroconductive film of one or each of the transparent electroconductive resin substrates. From the viewpoint of excellent adhesiveness, preferred are primer layer constitutions described in the following (a) to (e):

(a) a primer layer formed by use of a material containing a (meth)acrylate having a hydroxyl group in the molecule thereof, (b) a primer layer formed by use of a material containing a urethane acrylate having a pentaerythritol skeleton, (c) a primer layer formed by use of a phosphoric ester having one or more polymerizable groups in the molecule thereof, (d) a primer layer formed by use of a silane coupling agent having an amino group, and (e) a primer layer formed by use of a material in which metal oxide fine particles are dispersed in an organic binder resin.

Hereinafter, a description will be made about the preferred structures (a) to (e) of the primer layer.

(a) Primer layer formed by use of a material containing a (meth)acrylate having, in the molecule thereof, a hydroxyl group:

Specific examples of the (meth)acrylate having a hydroxyl group in the molecule thereof, used to form the primer layer, are compounds represented by formulae (1) to (8) illustrated below. However, the invention is not limited to these examples.

The (meth)acrylate having a hydroxide group is more preferably a (meth)acrylate having a hydroxyl group and a pentaerythritol skeleton.

About the "(meth)acrylate having a hydroxyl group and a pentaerythritol skeleton", the following is permissible: as far as the (meth)acrylate has in the molecule a hydroxyl group, all hydroxyl groups of the pentaerythritol are substituted. This wording preferably denotes a (meth)acrylate in which at least one hydroxyl group of the pentaerythritol is unsubstituted.

About the pentaerythritol skeleton, a description will be made in paragraphs about the structure (b).

[Chemical Formula 1]

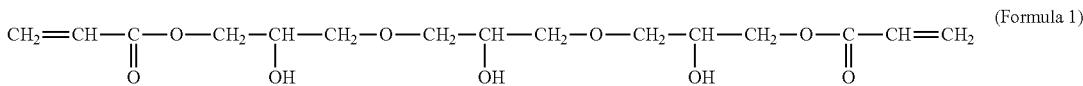

(Formula 1)

[Chemical Formula 2]

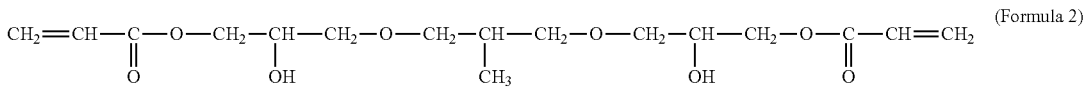

(Formula 2)

[Chemical Formula 3]

(Formula 3)

-continued

[Chemical Formula 4]

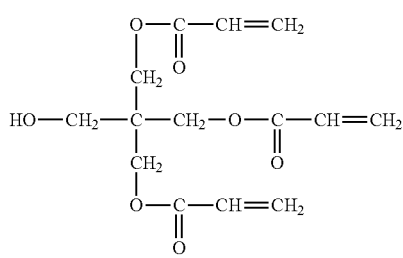

(Formula 4)

[Chemical Formula 5]

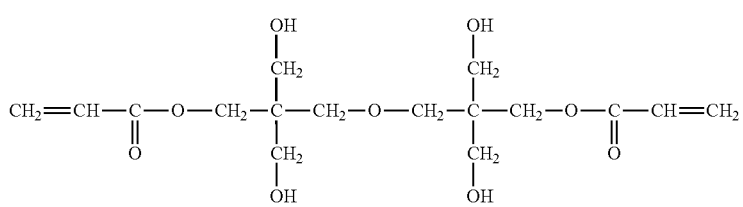

(Formula 5)

[Chemical Formula 6]

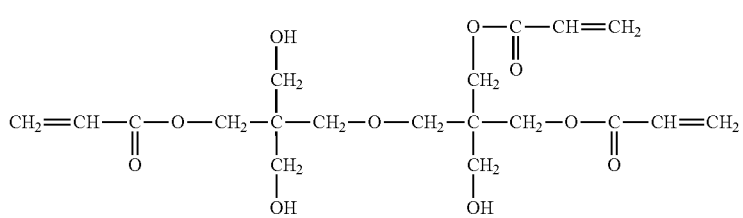

(Formula 6)

[Chemical Formula 7]

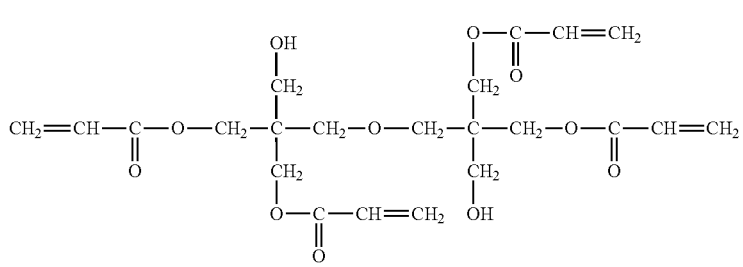

(Formula 7)

[Chemical Formula 8]

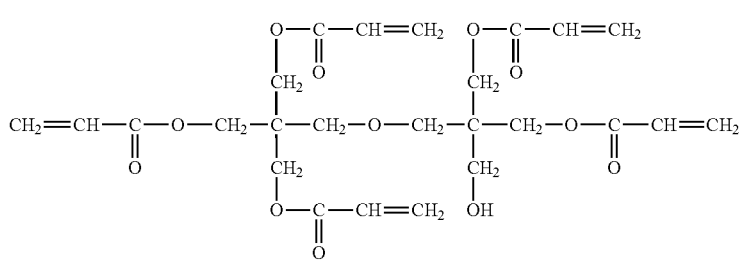

(Formula 8)

The (meth)acrylate having a hydroxyl group in the molecule thereof used in the invention, may be synthesized by a known method. In the case of, for example, an epoxy ester, the ester may be yielded by causing an epoxy compound to react with a (meth)acrylic acid in the presence of an esterifying catalyst and a polymerization inhibitor in an inert gas.

Examples of the inert gas include nitrogen, helium, argon, and carbon dioxide. These may be used alone or in combination.

The esterifying catalyst may be, for example, a compound having tertiary nitrogen such as triethylamine, a pyridine derivative or an imidazole derivative, a phosphorus compound such as trimethylphosphine or triphenylphosphine, or an amine salt such as tetramethylammonium chloride or triethylamine. The addition amount thereof is from 0.000001 to 20% by mass, preferably from 0.001 to 1% by mass.

The polymerization inhibitor may be a polymerization inhibitor that is itself known, such as hydroquinone or tertbutylhydroquinone. The use amount thereof is selected from the range of 0.000001 to 0.1% by mass.

Examples of the epoxy ester include 2-hydroxy-3-phenoxypropyl acrylate (trade name: ARONICS M-5700, manufactured by Toagosei Co., Ltd., or trade name: EPOXY ESTER M-600A, manufactured by Kyoeisha Chemical Co., Ltd.), 2-hydroxy-3-acryloyloxypropyl methacrylate (trade name: LIGHT ESTER G-201P, manufactured by Kyoeisha Chemical Co., Ltd.), a glycerin diglycidyl ether acrylic-acid-adduct (trade name: EPOXY ESTER 80MFA, manufactured by Kyoeisha Chemical Co., Ltd.), and the like.

In the case of the (meth)acrylate having a hydroxyl group and a pentaerythritol skeleton, this ester can be yielded by causing pentaerythritol, dipentaerythritol or the like to react with acrylic acid or methacrylic acid in the air in the presence of an esterifying catalyst and a polymerization inhibitor. As the method for reaction for adding acrylic acid or methacrylic acid to pentaerythritol or dipentaerythritol, a known method described in JP-B-5-86972, or JP-A-63-68642 may be applicable.

Examples of commercially available products of the (meth)acrylate having a hydroxyl group in the molecule thereof include, in particular, LIGHT ESTER HOP, LIGHT ESTER HOA, LIGHT ESTER HOP-A, LIGHT ESTER HOB, LIGHT ESTER HO-MPP, LIGHT ESTER P-1M, LIGHT ESTER P-2M, LIGHT ESTER G-101P, LIGHT ESTER G-201P, LIGHT ESTER HOB-A, EPOXY ESTER M-600A, LIGHT ESTER HO-HH, LIGHT ACRYALTEs HOA-HH, HOA-MPL and HOA-MPE, LIGHT ACRYALTE P-1A, LIGHT ACRYALTE PE-3A, EPOXY ESTER 40EM, EPOXY ESTER 70PA, EPOXY ESTER 200PA, EPOXY ESTER 80MFA, EPOXY ESTER 3002M, EPOXY ESTER 3002A, EPOXY ESTER 3000MK, and EPOXY ESTER 3000A, each of which is manufactured by Kyoeisha Chemical Co., Ltd.; and ARONICS M-215, ARONICS M-305, ARONICS M-306, ARONICS M-451, ARONICS M-403, ARONICS M-400, ARONICS M402, ARONICS M-404, and ARONICS M-406, each of which is manufactured by Toagosei Co., Ltd.; PM-21, which is manufactured by Nippon Kayaku Co., Ltd.; PHOSMER PP, PHOSMER PE, and PHOSMER M, each of which is manufactured by Uni-Chemical Co., Ltd; and the like.

For the material for forming the primer layer, a (meth)acrylate described below may be used besides the above-mentioned (meth)acrylate having a hydroxyl group in the molecule thereof. Usable examples of the (meth)acrylate include compounds as described below. However, the (meth) acrylate is not limited to these examples in the invention. Acrylates such as sorbitol tetraacrylate, 2-hydroxy-3-acryloyloxypropyl methacrylate, 2-hydroxy-3-phenoxypropyl acrylate, 2-acryloyloxy-2-hydroxyethyl phthalate, a methacrylic acid adduct of ethylene glycol diglycidyl ether, an acrylic acid adduct of tripropylene glycol diglycidyl ether, a methacrylic acid or acrylic acid adduct of bisphenol A diglycidyl ether, a methacrylic acid or acrylic acid adduct of bisphenol A propylene oxide 2-mol-adduct diglycidyl ether, 2-hydroxyethyl methacrylate, 2-hydroxypropyl methacrylate, 2-hydroxyethyl acrylate, 2-hydroxypropyl acrylate, 2-hydroxybutyl methacrylate, and sorbitol pentaacrylate; methacrylates such as pentaerythritol dimethacrylate, pentaerythritol trimethacrylate, sorbitol tetramethacrylate, dipentaerythritol dimethacrylate, dipentaerythritol trimethacrylate, and dipentaerythritol tetramethacrylate; crotonates such as pentaerythritol dicrotonate, and pentaerythritol tricrotonate; itaconates such as pentaerythritol diitaconate, pentaerythritol triitaconate, dipentaerythritol triitaconate, and dipentaerythritol pentaitaconate; and isocyanuric acid ethylene oxide modified diacrylate.

It is preferred that the (meth)acrylate having a hydroxyl group in the molecule thereof, used to form the primer layer, is cured, optionally together with a different (meth)acrylate, into a thin film by use of a thermopolymerization initiator or a photopolymerization initiator. The method for thermopolymerization and that for the photopolymerization are not particularly limited, and may each be an ordinary curing method.

The thermopolymerization initiator used in the invention may be any agent that is discomposed by heat so as to generate radicals, thereby making it possible to start the polymerization of a polymerizable compound. Radical initiators useful therefor are known initiators, examples thereof including organic peroxides, and azonitriles. However, the initiator is not limited thereto. Examples of the organic peroxides include alkyl peroxides, aryl peroxides, acyl peroxides, aroyl peroxides, ketone peroxides, peroxycarbonates, peroxycarboxylates, and the like.

Examples of the alkyl peroxides include diisopropyl peroxide, di-tert-butyl peroxide, di-tert-amyl peroxide, tert-butylperoxy-2-ethyl hexanoate, tert-amylperoxy-2-ethyl hexanoate, tert-butyl hydroperoxide, and the like.

Examples of the aryl peroxide include dicumyl peroxide, cumyl hydroperoxide, and the like.

Examples of the acyl peroxides include dilauroyl peroxide, and the like.

Examples of the aroyl peroxides include dibenzoyl peroxide, and the like.

Examples of the ketone peroxides include methyl ethyl ketone peroxide, and cyclohexanone peroxide, and the like.

Examples of the azonitriles include azobisisobutyronitrile, and azobisisopropylnitirle, and the like.

Examples of commercially available products of the thermopolymerization initiator include PEROYL IB, PERCUMYL ND, PEROYL NPP, PEROYL IPP, PEROYL SBP, PEROCTA ND, PEROYL TCP, PERROYL OPP, PERHEXYL ND, PERBUTYL ND, PERBUTYL NHP, PERHEXYL PV, PERBUTYL PV, PEROYL 355, PEROYL L, PEROCTA O, PEROYL SA, PERHEXA 250, PERHEXYL O, NYPER PMB, PERBUTYL O, NYPER BMT, NYPER BW, PERHEXA MC and PERHEXA TMH (each manufactured by NOF Corp.); and azo compounds, in particular, 2,2'-azobis(4-methoxy-2,4-dimethylvaleronitrile), 2,2'-azobis(2,4-dimethylvaleronitrile), 2,2'-azobis(2-methyl-butyronitrile), 2,2'-azobis(N-(2-propenyl)-2-methylpropionamide) and/or dimethyl 2,2'-azobis(2-methylpropionate), dimethyl 2,2'-azoisobutyrate, and the like.

The photopolymerization initiator may be any agent that is decomposed by irradiation with light so as to generate radicals, thereby making it possible to start the polymerization of a polymerizable compound. Examples thereof include acetophenone, acetophenone benzyl ketal, 1-hydroxycyclohexyl phenyl ketone, 2,2-dimethoxy-2-phenylacetophenone, xanthone, fluorenone, benzaldehyde, anthraquinone, triphenylamine, carbazole, 3-methylacetophenone, 4-chlorobenzophenone, 4,4'-dimethoxybenzophenone, 4,4'-diaminobenzophenone, Michler's ketones, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, bis-(2,6-dimethoxybenzoyl)-2,4,4-trimethylpentylphosphine oxide, and the like. However, the initiator is not limited thereto.

Examples of commercially available products of the photopolymerization initiator include IRGACURE 651, IRGACURE 184, IRGACURE 500, IRGACURE 2959, IRGACURE 127, IRGACURE 754, IRGACURE 907, IRGACURE 369, IRGACURE 379, IRGACURE 379EG, IRGACURE 1300, IRGACURE 819, IRGACURE 819DW, IRGACURE 1800, IRGACURE 1870, IRGACURE 784, IRGACURE OXE01, IRGACURE OXE02, IRGACURE 250, IRGACURE PAG103, IRGACURE PAG108, IRGACURE PAG121, IRGACURE PAG203, DAROCURE 1173, DAROCURE MBF, DAROCURE TPO, DAROCURE 4265, DAROCURE EDB, and DAROCURE EHA (each manufactured by Ciba Japan K.K.); C0014, B1225, D1640, D2375, D2963, M1245, B0103, C1105, C0292, E0063, P0211, I0678, P1410, P1377, M1209, F0362, B0139, B1275, B0481, D1621, B1267, B1164, C0136, C1485, I0591, F0021, A0061, B0050, B0221, B0079, B0222, B1019, B1015, B0942, B0869, B0083, B2380, B2381, D1801, D3358, D2248, D2238, D2253, B1231, M0792, A1028, B0486, T0157, T2041, T2042, T1188 and T1608 (each manufactured by Tokyo Chemical Industry Co., Ltd.).

(b) Primer layer formed by use of a material containing a urethane acrylate having a pentaerythritol skeleton:

Herein the wording "pentaerythritol skeleton" denotes a structure illustrated in a formula (a) below. The "urethane acrylate containing a pentaerythritol skeleton" specifically has a structure wherein at least one hydrogen atom in the hydroxyl groups of pentaerythritol present in the molecule of the urethane acrylate is substituted with a carbamoyl group and further at least one of the hydroxyl groups is esterified with (meth)acrylic acid. At this time, the carbamoyl group and/or (meth)acrylic acid may also (each) have a substituent. The hydroxyl group substituted with the carbamoyl group and the hydroxyl group esterified with (meth)acrylic acid do not need to be hydroxyl groups bonded to the same pentaerythritol skeleton represented by the following formula (a):

[Chemical Formula 9]

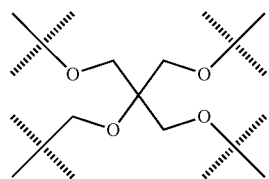

(Formula a)

It is also preferred that the urethane acrylate having a pentaerythritol skeleton in the invention has, as the pentaerythritol skeleton thereof, dipentaerythritol, wherein two are linked to each other through oxygen. In this case also, at least one hydrogen atom of the hydroxyl groups of the pentaerythritol is substituted with a carbamoyl group and further at least one of the hydroxyl groups is esterified with (meth)acrylic acid. At this time, the carbamoyl group and/or (meth)acrylic acid may also (each) have a substituent.

Furthermore, it is more preferred that the urethane acrylate also contains IPDI (3-isocyanatomethyl-3,5,5-trimethylcyclohexylisocyanate). It is also preferred that this urethane acrylate contains a hydroxide group in the molecule thereof.

Herein, the "IPDI (3-isocyanatomethyl-3,5,5-trimethylcyclohexylisocyanate) skeleton" denotes a structure represented by the following formula (b):

[Chemical Formula 10]

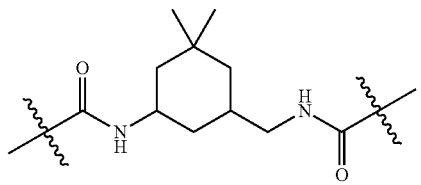

(Formula b)

Specific examples of the urethane acrylate having a pentaerythritol skeleton include compounds represented by the following formulae (9) to (15):

[Chemical Formula 11]

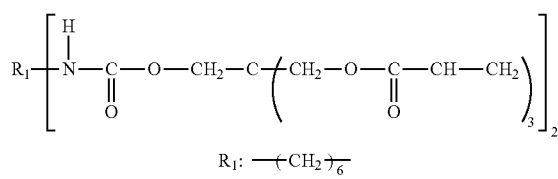

(Formula 9)

[Chemical Formula 12]

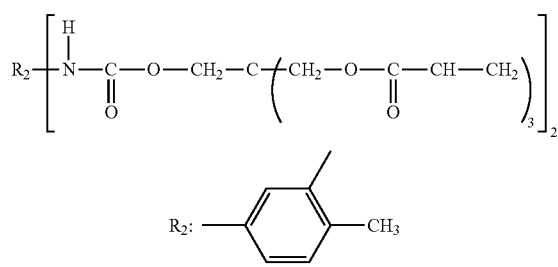

(Formula 10)

-continued
[Chemical Formula 13]
(Formula 11)
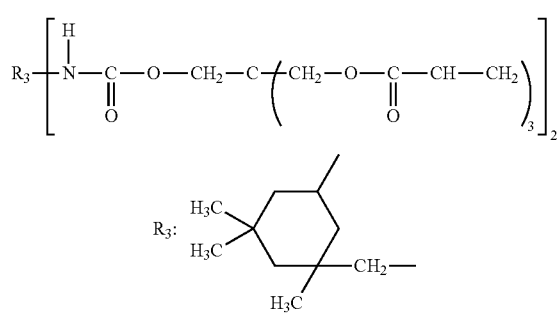
[Chemical Formula 14]
(Formula 12)
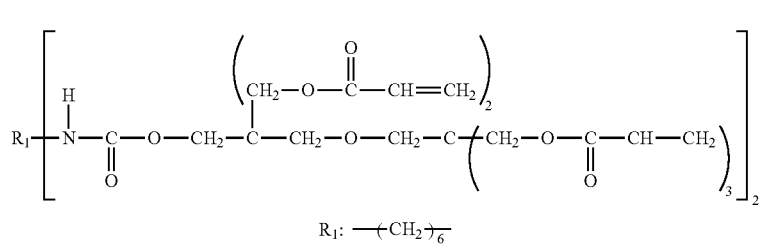
[Chemical Formula 15]
(Formula 13)
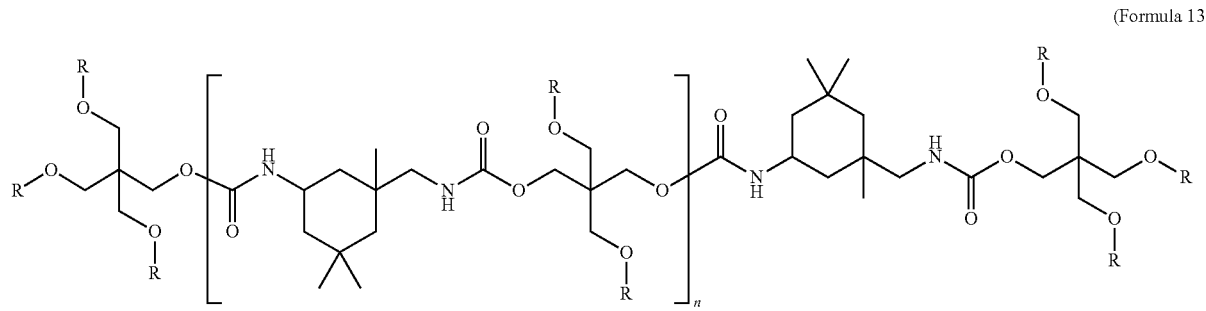
[Chemical Formula 16]
(Formula 14)
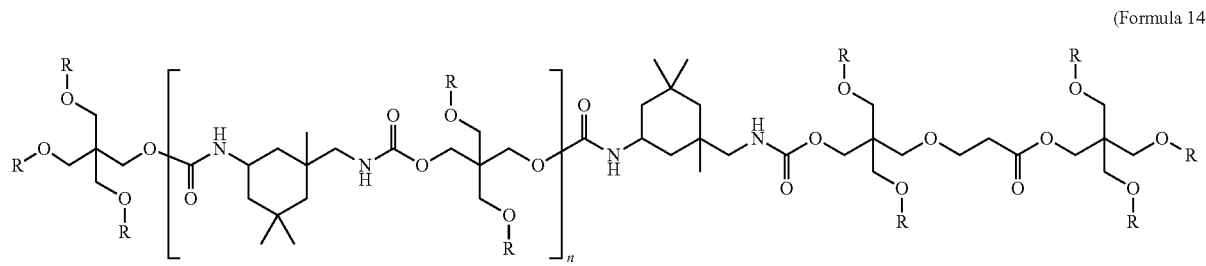
[Chemical Formula 17]
(Formula 15)
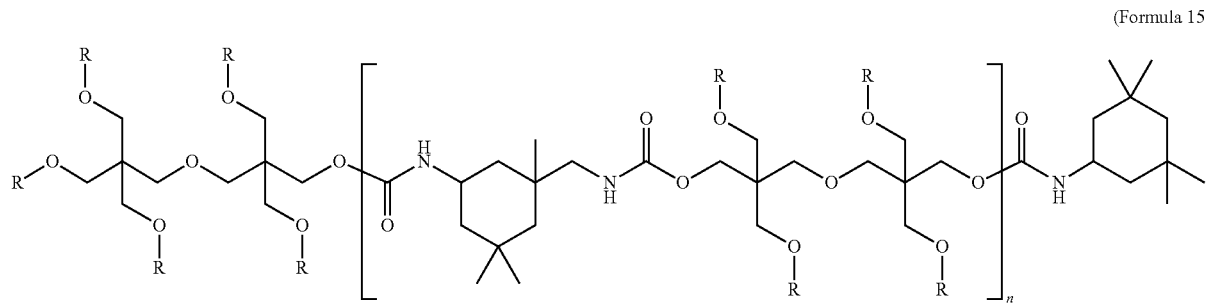

-continued

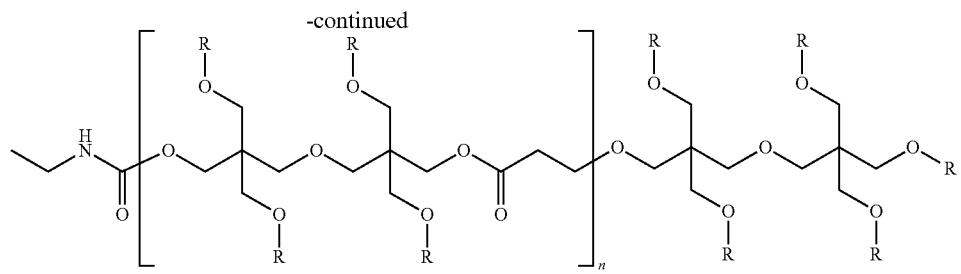

In each of formulae (13) to (15), R's, which may be the same or different, are each a radical or group illustrated below. At least one of R's is preferably H.

[Chemical Formula 18]

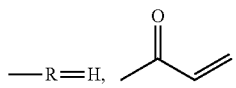

The urethane acrylate having pentaerythritol skeleton can be synthesized by a known method. For example, a urethane acrylate is generally obtained by causing hydroxyl groups of a polyol compound, a polyisocyanate compound or some other compound to react with a hydroxyl-group-containing (meth)acrylate by a known method; therefore, in the same way, the urethane acrylate having a pentaerythritol skeleton can be produced by, for example, any one of the following production methods 1 to 4:

"production method 1": a method of charging a polyol compound, a polyisocyanate compound and a (meth)acrylate having a pentaerythritol skeleton at a time, and causing the components to react with each other, "production method 2": a method of causing a polyol compound and a polyisocyanate compound to react with each other, and next causing the resultant to react with a (meth) acrylate having a pentaerythritol skeleton, "production method 3": a method of causing a polyisocyanate compound and a (meth)acrylate having a pentaerythritol skeleton to react with each other, and next causing the resultant to react with a polyol compound, and "production method 4": a method of causing a polyisocyanate compound and a (meth)acrylate having a pentaerythritol skeleton to react with each other, next causing the resultant to react with a polyol compound, and finally causing the resultant to react with the (meth)acrylate having a pentaerythritol skeleton.

In these reactions, a catalyst may be used. For example, a tin based catalyst such as dibutyltin laurate, or a tertiary amine catalyst is used.

Examples of the (meth)acrylate a pentaerythritol skeleton used in the production methods 1 to 4 include a (meth)acrylates having a hydroxyl group such as pentaerythritol diacrylate, pentaerythritol triacrylate, dipentaerythritol pentaacrylate, dipentaerythritol tetraacrylate, and the like.

Examples of the polyisocyanate compound used in the production methods 1 to 4 include 2,4-tolylenediisocyanate, 2,6-tolylenediisocyanate, 1,3-xylilenediisocyanate, 1,4-xylilenediisocyanate, 1,5-naphthalenediisocyanate, m-phenylenediisocyanate, p-phenylenediisocyanate, 3,3'-dimethyl-4,4'-diphenylmethanediisocyanate, 4,4'-diphenylmethanediisocyanate, 3,3"-diphenylmethanediisocyanate, 4,4'-biphenylenediisocyanate, 1,6-hexanediisocyanate, isophoronediisocyanate (3-isocyanatomethyl-3,5,5-trimethylcyclohexylisocyanate), methylenebis(4-cyclohexylisocyanate), 2,2,4-trimethylhexamethylenediisocyanate, 1,4-hexamethylenediisocyanate, bis(2-isocyanatoethyl) fumarate, 6-isopropyl-1,3-phenyldiisocyanate, 4-diphenylpropanediisocyanate, lysinediisocyanate, and the like.

The urethane acrylate having a pentaerythritol skeleton may be a commercially available product containing an urethane acrylate having a pentaerythritol skeleton. Examples thereof include UA-306H, UA-3061, UA-306T, and UA-510H (each manufactured by Kyoeisha Chemical Co., Ltd.).

The urethane acrylate containing both of a pentaerythritol skeleton and an IPDI skeleton can be yielded by using isophoronediisocyanate as the polyisocyanate compound in each of the production methods 1 to 4.

A commercially available product may be used. Specific examples of the commercially available product containing the urethane acrylate containing both of a pentaerythritol skeleton and an IPDI skeleton include the following:

UVHC 3000 (manufactured by Momentive Performance Materials Japan LLC, UVHC 7000 (manufactured by Momentive Performance Materials Japan LLC), and the like.

(c) Primer layer formed by use of a phosphoric ester having one or more polymerizable groups in the molecule thereof:

The material for forming the primer layer may be a phosphoric ester having one or more polymerizable groups in the molecule thereof, and is preferably a phosphoric monoester or phosphoric diester having one or more polymerizable groups in the molecule thereof. About the phosphoric ester having one or more polymerizable groups in the molecule thereof, its ester moiety or moieties usually have the polymerizable group(s). Preferably, the one ester moiety has the one polymerizable group. The number of the polymerizable groups in the molecule is preferably one or two. The phosphoric ester preferably has a structure of a (poly)alkylene oxide such as (poly)ethylene oxide or (poly)propylene oxide in the molecule thereof.

The polymerizable group is preferably a group polymerizing by irradiation with an energy ray. The group is, for example, a group having an ethylenically unsaturated double bond such as a (meth)acryloyloxy group.

More specifically, the material for forming the primer layer is preferably a phosphoric monoester or phosphoric diester a (meth)acryloyloxy group having in the molecule thereof.

An example of the phosphoric monoester or phosphoric diester having a (meth)acryloyloxy group is a compound represented by the following formula (16) or (17):

[Chemical Formula 19]

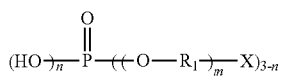
(Formula 16)

wherein R1(s) (each independently) represent(s) a linear or branched alkylene group having 1 to 4 carbon atoms, m is an integer of 1 or more, n is 1 or 2, X(s) (each independently) is/are selected from the following:

[Chemical Formula 20]

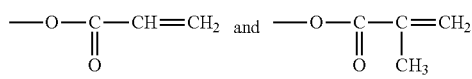

m is preferably from 1 to 10, more preferably from 1 to 6, or

[Chemical Formula 21]

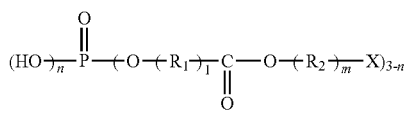
(Formula 17)

wherein R1(s) and R2(s) each independently represent a linear or branched alkylene group having 1 to 4, l(s) and m(s) are each independently an integer of 1 or more, and n is 1 or 2, and X(s) is/are (each independently) selected from the following:

[Chemical Formula 22]

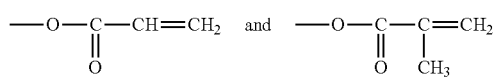

l(s) in/are (each) preferably from 1 to 10, more preferably from 1 to 5, and m(s) is/are (each) preferably from 1 to 5, more preferably from 1 to 2.

These phosphoric monoester or phosphoric diester having the (meth)acryloyloxy group may be used in a mixture form, or may each be used in the form of a mixture with a different (meth)acrylate or some other.

Examples of the phosphoric ester having one or more polymerizable groups in the molecule thereof include PM-21 (the following formula c) manufactured by Nippon Kayaku Co., Ltd.; P-2M (the following formula d) and P-1M (the following formula e) each manufactured by Kyoeisha Chemical Co., Ltd.; PHOSPMER PE (the following formula f) and PHOSPMER PP (the following formula g) each manufactured by Uni-Chemical Co., Ltd.; and the like:

[Chemical Formula 23]

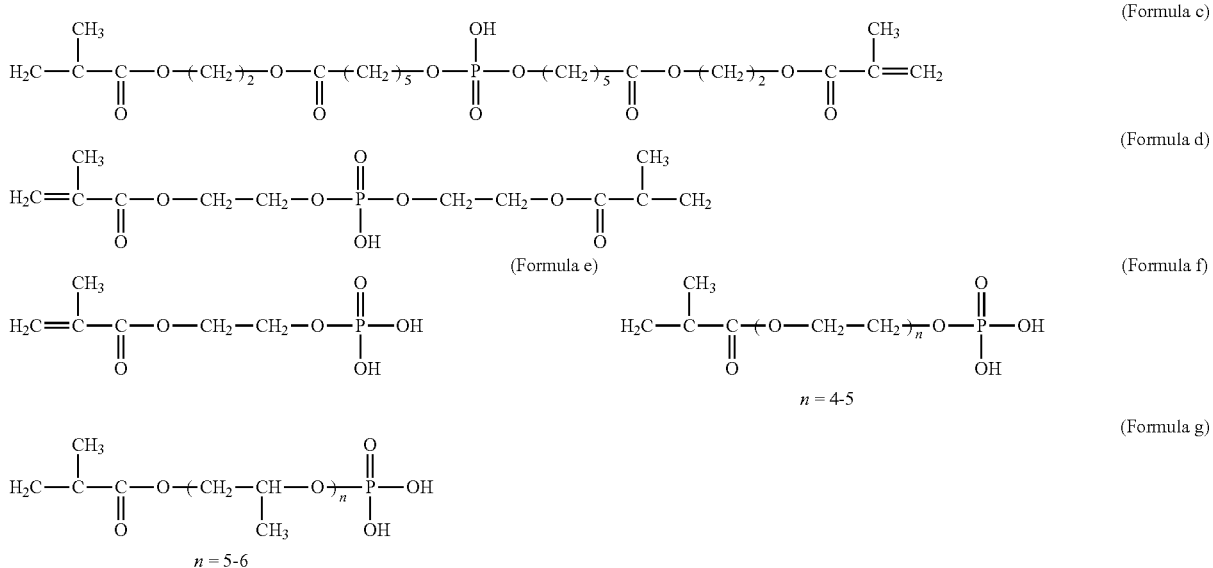

(d) Primer layer formed by use of a silane coupling agent having an amino group:

An example of the silane coupling agent having an amino group is a compound represented by the following formula (18) or (19):

[Chemical Formula 24]

$$H_2N-R_1-NH-R_2-Si(-OR_4)_{3-n}$$
$$(R_3)_n$$
(Formula 18)

wherein $R_1$ and $R_2$ each independently represent a linear or branched alkylene group having 1 to 4 carbon atoms, $R_3$(s) each independently represent(s) a linear or branched alkyl group having 1 to 4 carbon atoms, $R_4$(s) each independently represent(s) a methyl or ethyl group, and n is an integer of 0 to 2,

[Chemical Formula 25]

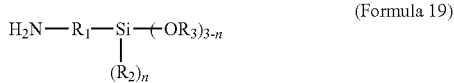

(Formula 19)

wherein $R_1$ represents a linear or branched alkylene group having 1 to 4 carbon atoms, $R_2$(s) each independently represent(s) a linear or branched alkyl group having 1 to 4 carbon atoms, $R_3$(s) each independently represent(s) a methyl or ethyl group, and n is an integer of 0 to 2.

An example of the silane coupling agent having an amino group is an agent, KBM-603 (the following formula h), manufactured by Shin-Etsu Chemical Co., Ltd, or the like:

[Chemical Formula 26]

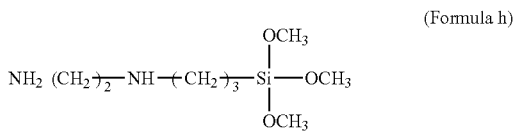

(Formula h)

(e) Primer layer formed by use of a material in which metal oxide fine particles are dispersed in an organic binder resin:

It is also preferred that the primer layer is a thin film in which metal oxide fine particles are dispersed in an organic binder resin. This primer layer is preferably a thin film formed by curing a polymerizable monomer or oligomer as the organic binder resin thermally or optically.

The above materials (a) to (d) used in the primer layer constitutions may each be used as the organic binder resin.

It is further preferred that this primer layer is made of a thin film composed of the organic binder resin being partially a (meth)acrylate or an epoxy, or the two.

The metal oxide particles are preferably any one of $ZrO_2$, $SiO_2$, ITO, $TiO_2$, ZnO, $Al_2O_3$, GZO, cobalt blue, $CeO_2$, $BiO_3$, CoO, CuO, $Fe_2O_3(\alpha)$, $Fe_2O_3(\gamma)$, $Ho_2O_3$, $Mn_3O_4$, $SnO_2$, $Y_2O_3$, AZO, MgO, and $CO_3O_4$, or a mixture thereof.

About the metal oxide fine particles in the invention, the average particle diameter thereof is preferably 100 nm or less, more preferably 50 nm or less in order not to cause an increase in the haze of the light control film.

In the invention, the average particle diameter is the particle diameter thereof obtained by making a calculation in accordance with the following equation, using the specific surface area thereof measured by means of a specific surface area measuring device according to the BET method:

the average particle diameter (nm)=6000/(the density [g/cm$^3$]×the specific surface area [m$^2$/g])

It is advisable to select metal oxide fine particles having an average particle diameter within the above-mentioned range appropriately from commercially available products.

The thin film containing the metal oxide fine particles may be formed by a dry process such as sputtering or vacuum deposition, or by a wet process in which the raw material thereof is applied in the form of a solution or liquid dispersion.

When the thin film containing the metal oxide fine particles is formed through the wet process, the adhesiveness between the thin film and the transparent electroconductive resin substrates is bad in the case that the thin film is a thin film made only of the metal oxide fine particles. As a result, the effect of improving the adhesiveness between the light control film and the transparent electroconductive resin substrates may be small. It is therefore preferred that the metal oxide fine particles are dispersed in the organic binder resin, and the resultant is used to form the thin film.

The organic binder resin used in the primer layer (e) above, in which the metal oxide fine particles are to be dispersed, is not particularly limited as far as the resin easily forms a film from a solution thereof. The resin may be a polymeric resin, or a polymerizable monomer or oligomer which is applied in the form of a solution thereof, and then thermally or optically polymerized so as to be formed into a film.

A specific example of the polymerizable monomer or oligomer may be the above-mentioned (meth)acrylate used in the primer layer (a), the urethane acrylate used in the primer layer (b), or a different (meth)acrylate having no hydroxyl group. Examples of the (meth)acrylate having no hydroxyl group include ethylene glycol dimethacrylate, diethylene glycol dimethacrylate, triethylene glycol dimethacrylate, tetraethylene glycol dimethacrylate, nonaethylene glycol dimethacrylate, tetradecaethylene glycol dimethacrylate, 1,4-butanediol dimethacrylate, neopentyl glycol dimethacrylate, 1,6-hexanediol dimethacrylate, 1,9-nonanediol dimethacrylate, 1,10-decanediol dimethacrylate, dimethyloltricyclodecane dimethacrylate, dimethacrylate of an ethylene oxide adduct of bisphenol A, trimethylolpropane trimethacrylate, triethylene glycol diacrylate, tetraethylene glycol diacrylate, nonaethylene glycol diacrylate, tetradecaethylene glycol diacrylate, polytetramethylene glycol diacrylate, neopentyl glycol diacrylate, 3-methyl-1,5-pentanediol diacrylate, 1,6-hexanediol diacrylate, 2-butyl-2-ethyl-1,3-propanediol diacrylate, 1,9-nonadiol diacrylate, dimethyloltricyclodecane diacrylate, diacrylate of an ethylene oxide adduct of bisphenol A, diacrylate of a propylene oxide adduct of bisphenol A, trimethylolpropane acrylate benzoate, neopentylglycol hydroxypivalate diacrylate, trimethylolpropane triacrylate, ethylene oxide modified trimethylolpropane triacrylate, propylene oxide modified trimethylolpropane triacrylate, pentaerythritol tetraacrylate, dipentaerythritol hexaacrylate, isocyanuric acid ethylene oxide modified triacrylate, polypropylene glycol diacrylate, polyethylene glycol diacrylate, ε-caprolactone modified tris(acryloxyethyl)isocyanurate, phenylglycidyl ether acrylate urethane prepolymer, and the like, which may be used alone or in the form of a mixture. In the invention, the (meth)acrylate is not limited to these examples.

Examples of commercially available products of the polymerizable monomer or oligomer include LIGHT ESTER EG, LIGHT ESTER 2EG, LIGHT ESTER 3EG, LIGHT ESTER 4EG, LIGHT ESTER 9G, LIGHT ESTER 14EG, LIGHT ESTER 1,4BG, LIGHT ESTER NP, LIGHT ESTER 1,6HX, LIGHT ESTER 1,9ND, LIGHT ESTER 1,10DC, LIGHT ESTER DCP-M, LIGHT ESTER BP-2EMK, LIGHT ESTER BP-4EM, LIGHT ESTER BP-6EM, LIGHT ESTER TPM, LIGHT ACRYLATE 3EG-A, LIGHT ACRYLATE 4EG-A, LIGHT ACRYLATE 9EG-A, LIGHT ACRYLATE 14EG-A, LIGHT ACRYLATE PTMGA-250, LIGHT ACRYLATE NP-A, LIGHT ACRYLATE MPD-A, LIGHT ACRYLATE 1,6HX-A, LIGHT ACRYLATE BEPG-A, LIGHT ACRYLATE 1,9ND-A, LIGHT ACRYLATE MOD-A, LIGHT ACRYLATE DCP-A, LIGHT ACRYLATE BP-4EA, LIGHT ACRYLATE BP-4PA, LIGHT ACRYLATE BA-134, LIGHT ACRYLATE BP-10EA, LIGHT ACRYLATE HPP-A, LIGHT ACRYLATE TMP-A, LIGHT ACRYLATE TMP- 3EO-A, LIGHT ACRYLATE TMP-6EO-3A, LIGHT ACRYLATE PE-4A, LIGHT ACRYLATE DPE-6A, AT-600, and AH-600, each of which is manufactured by Kyoeisha Chemical Co., Ltd.; ARONICS M-215, ARONICS M-220, ARONICS M-225, ARONICS M-270, ARONICS M-240, ARONICS M-310, ARONICS M-321, ARONICS M-350, ARONICS M-360, ARONICS M-370, ARONICS M-315, ARONICS M-325, and ARONICS M-327, each of which is manufactured by Toagosei Co., Ltd.; and the like.

The content by percentage of the metal oxide fine particles in the primer layer is, for example, from 4.5 to 95% by mass of the whole of the materials of the primer layer (the whole of the dried and cured primer layer) from the viewpoint of the restraint of a rise in the haze of the light control film.

When the metal oxide fine particles are used in the primer layer, the primer layer can be obtained to have a high hardness, thereby producing advantageous effects that an improvement is made in the adhesiveness between the light control film and the transparent electroconductive films of the transparent electroconductive resin substrates, and further at the time of peeling the light control film to create out electrodes, the underlying transparent electroconductive films are not easily damaged.

When the polymerizable monomer or oligomer is used for the formation of the primer layer, it is preferred to use a thermopolymerization initiator or a photopolymerization initiator to cure the monomer or oligomer into a thin film. The method for the thermocuring and that for the photocuring are not particularly limited, and as such methods, each ordinary curing method can be employed. The thermopolymerization initiator and the photopolymerization initiator may be the same as described above.

In any one of the primer layers (a) to (e) in the invention, the film thickness of the primer layer is preferably 500 nm or less, more preferably from 1 to 500 nm. The thickness is preferably within the range of 10 to 500 nm, more preferably within the range of 10 to 200 mm, even more preferably within the range of 40 to 100 nm.

When the film thickness is 1 nm or more, a sufficient bonding strength can be expressed. When the film thickness is 500 nm or less, the tackiness of the primer layer is not too strong so that the following inconvenience tends not to be easily caused: after the primer layer is applied and the resultant is wound around a roll, the primer layer is transferred onto the rear surface of the transparent resin substrate film or when the light control film is produced, the positioning of the transparent resin substrate film to be laminated becomes difficult.

The film thickness of the primer layer can be measured by reflectrometry of ultraviolet rays or visible rays, X-ray reflectivity analysis, ellipsometry or the like.

<Light Control Layer>

The light control layer in the invention is composed of a light control material containing: a resin matrix; and a light control suspension dispersed in the resin matrix. The resin matrix contains a polymeric medium, and the light control suspension is a material wherein light control particles are dispersed in a dispersing medium in the state that the particles can flow. As the polymeric medium and the dispersing medium (dispersing medium in the light control suspension), use is made of a polymeric medium and a dispersing medium that make it possible that when the polymeric medium and a cured product therefrom can undergo phase-separation from the dispersing medium at least when these materials have been formed into a film. It is preferred to use a combination of a polymeric medium and a dispersing medium that are incompatible with each other or are partially compatible with each other.

The polymeric medium used in the invention may be a medium which contains (A) a resin having a substituent with an ethylenically unsaturated bond, and (B) a photopolymerization initiator, and which is irradiated with an energy beam such as ultraviolet rays, visible rays, or an electron beam, thereby being cured. The resin (A) having an ethylenically unsaturated bond, is preferably a silicone resin, an acrylic resin, a polyester resin or some other from the viewpoint of easiness in the synthesis thereof, the light control performances and endurance thereof, and others. It is preferred from the viewpoint of the light control performances, the endurance that these resins each have, and the like, as a substituent thereof, an alkyl group such as a methyl, ethyl, propyl, isopropyl, butyl, isobutyl, tert-butyl, amyl, isoamyl, hexyl or cyclohexyl group, or an aryl group such as a phenyl or naphthyl group.

Specific examples of the silicone resin include resins described in JP-B-53-36515, JP-B-57-52371, JP-B-58-53656, and JP-B-61-17863.

The silicone resin is synthesized by causing the following to undergo dehydrogenation condensation reaction and dealcoholization reaction in the presence of an organic tin catalyst such as 2-ethylhexanetin: a silanol-both-terminated siloxane polymer such as silanol-both-terminated polydimethylsiloxane, silanol-both-terminated polydiphenylsiloxane-dimethylsiloxane copolymer or silanol-both-terminated polydimethyldiphenylsiloxane; a trialkylalkoxysilane such as trimethylethoxysilane; a silane compound containing an ethylenically unsaturated bond such as (3-acryloxypropyl)methyldimethoxysilane; and some other compound. The form of the silicone resin is preferably of a solvent-free type. In other words, in the case of using a solvent for the synthesis of the silicone resin, it is preferred to remove the solvent after the synthesis reaction.

About the charging formulation of the individual raw materials when the silicone resin is produced, the amount of the silane compound containing an ethylenically unsaturated bond such as (3-acryloxypropyl)methoxysilane, is preferably from 19 to 50% by mass of the total of the siloxane(s) and the silane compound(s) as the starting materials, more preferably from 25 to 40% by mass thereof. If the amount of the silane compound containing an ethylenically unsaturated bond is less than 19% by mass, the ethylenically unsaturated bond concentration in the finally-obtained resin tends to be far lower than a desired concentration. If the concentration is more than 50% by mass, the ethylenically unsaturated bond concentration in the resultant resin tends to be far higher than a desired concentration.

The acrylic resin can be yielded, for example, by copolymerizing a main-chain-forming monomer such as an alkyl (meth)acrylate, an aryl(meth)acrylate, benzyl(meth)acrylate or styrene, with a monomer which contains a functional group for the introduction of an ethylenically unsaturated bond such as (meth)acrylic acid, hydroxyethyl(meth)acrylate, isocyanatoethyl(meth)acrylate or glycidyl(meth)acrylate, to synthesize a prepolymer once; and next causing the prepolymer to undergo addition reaction with glycidyl(meth)acrylate, isocyanatoethyl(meth)acrylate, hydroxyethyl(meth)acrylate, (meth)acrylic or some other monomer in order to cause the monomer to react with the functional group of the prepolymer.

The polyester resin is not particularly limited, and may be a resin that can easily be produced by a known method.

The molecular weight of the resin (A) having an ethylenically unsaturated bond is preferably from 20,000 to 100,000, more preferably from 30,000 to 80,000, the molecular weight being a weight-average molecular weight in terms of polystyrene and being obtained by gel permeation chromatography.

The ethylenically unsaturated bond concentration in the resin having an ethylenically unsaturated bond is preferably from 0.3 to 0.5 mol/kg. When this concentration is 0.3 mol/kg or more, end regions of the light control film are easily processed so that the transparent electrodes opposite to each other do not short-circuit therebetween. Thus, the light control film does not tend to give a poor electrical reliability. By contrast, when the concentration is 0.5 mol/kg or less, the cured polymeric medium is not easily dissolved into the dispersing medium which constitutes the droplets of the light control suspension, so as to make it possible to avoid a matter that the dissolved polymeric medium hinders the movement of the light control particles in the droplets so that the light control performance declines.

The ethylenically unsaturated bond concentration in the resin (A) having an ethylenically unsaturated bond is obtained from the ratio between integrated-intensities of hydrogen according to NMR. When the conversion rate of the charged raw material into the resin is known, the concentration is also obtained by calculation.

The photopolymerization initiator (B) used in the polymeric medium may be a compound described in J. Photochem. Sci. Technol., 2, 283 (1977), specific examples thereof including 2,2-dimethoxy-1,2-diphenylethane-1-one, 1-(4-(2-hydroxyethoxy)phenyl)-2-hydroxy-2-methyl-1-propane-1-one, bis(2,4,6-trimethylbenzoyl)phenylphosphine oxide, 2-hydroxy-2-methyl-1-phenylpropane-1-one, 1-hydroxycyclohexyl phenyl ketone, and the like.

The use amount of the photopolymerization initiator (B) is preferably from 0.1 to 20 parts by mass, more preferably from 0.2 to 10 parts by mass for 100 parts by mass of the resin (A) above.

Besides the resin (A) having a substituent with an ethylenically unsaturated bond, the following may be used as a constituting material of the polymeric medium: an organic solvent soluble resin or a thermoplastic resin such as polyacrylic acid or polymethacrylic acid having a weight-average molecular weight of 1,000 to 100,000, the molecular weight being a molecular weight in terms of polystyrene and being measured by gel permeation chromatography.

An additive such as a coloration inhibitor such as dibutyltin dilaurate, may be added into the polymeric medium if necessary. The polymeric medium may contain a solvent. The solvent may be tetrahydrofuran, toluene, heptane, cyclohexane, ethyl acetate, ethanol, methanol, isoamyl acetate, hexyl acetate or the like.

It is preferred to use, as the dispersing medium in the light control suspension, a liquid copolymer which: fulfills a function of a dispersing medium in the light control suspension; adheres onto the light control particles selectively to cover the particles so that at the time of phase separation thereof from the polymeric medium, the dispersing medium acts to cause the particles to be shifted to the phase-separated droplet phase; has neither electroconductivity nor affinity with the polymeric medium.

The liquid copolymer is preferably, for example, a (meth) acrylic acid ester oligomer having fluoro groups and/or hydroxyl groups, more preferably a (meth)acrylic acid ester oligomer having fluoro groups and hydroxyl groups. When such a liquid copolymer is used, the monomer units of either the fluoro groups or the hydroxyl groups face toward the light control particles. The monomer units of the other function to cause the light control suspension to be stably kept as droplets in the polymeric medium. Therefore, the light control particles are very homogeneously dispersed in the light control suspension, and at the time of the phase separation the light control particles are introduced into the phase-separated droplets.

The (meth)acrylic acid ester oligomer having fluoro groups and/or hydroxyl groups may be an oligomer obtained by using a fluoro-group-containing monomer and/or a hydroxyl-group-containing monomer, and by carrying out copolymerization with the monomer(s). Specific examples thereof include 2,2,2-trifluoroethyl methacrylate/butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, 1H,1H,2H,2H-heptadecafluorodecyl methacrylate/butyl acrylate/2-hydroxyethyl acrylate copolymer, and the like. The (meth)acrylic acid ester oligomers each preferably have both of fluoro and hydroxyl groups.

The weight-average molecular weight of these (meth) acrylic acid ester oligomers is preferably from 1,000 to 20,000, more preferably from 2,000 to 10,000, the molecular weight being a molecular weight in terms of standard polystyrene and being measured by gel permeation chromatography.

The use amount of the fluoro-group-containing monomer that is one of the starting materials of each of these (meth) acrylic acid ester oligomers is preferably from 6 to 12% by mole of the total of monomers that are the starting materials, more effectively from 7 to 8% by mole thereof. If the use amount of the fluoro-group-containing monomer is more than 12% by mole, the refractive index tends to become large so that the light transmittance lowers. The use amount of the hydroxyl-group-containing monomer that is one of the starting materials of each of these (meth)acrylic acid ester oligomers is preferably from 0.5 to 22.0 by mole, more effectively from 1 to 8% by mole. If the use amount of the hydroxyl-group-containing monomer is more than 22.0% by mole, the refractive index tends to become large so that the light transmittance lowers.

The light control suspension used in the invention is a substance wherein light control particles are dispersed in the dispersing medium in the state that the particles can flow. As the light control particles, for example, the following are preferably used: needle-form small crystals of a polyiodide produced by causing iodine and a iodide to react with one material selected from the group consisting of pyrazine-2,3-dicarboxylic acid dihydrate, pyrazine-2,5-dicarboxylic acid dihydrate, and pyridine-2,5-dicarboxylic acid monohydrate, which are each a precursor of the light control particles, in the presence of a polymeric dispersing agent that is not affinitive with the polymeric medium or the resin component in the polymeric medium, that is, the above resin (A) having a substituent with an ethylenically unsaturated bond, and that is further capable of making the dispersibility of the light control particles high. A usable example of the polymeric medium is nitrocellulose and the like. The iodide may be calcium iodide or the like. Examples of the thus-obtained polyiodide include compounds represented by the following general formulae:

$CaI_2(C_6H_4N_2O_4)XH_2O$ wherein X: 1 to 2, and
$CaI_a(C_6H_4N_2O_4)_b cH_2O$ wherein a: 3 to 7, b: 1 to 2, and c: 1 to 3. These polyiodides are each preferably a needle crystal.

The light control particles used in the light control suspension for the light control film may be, for example, light control particles disclosed in U.S. Pat. No. 2,041,138 (E. H. Land), U.S. Pat. No. 2,306,108 (Land et al.), U.S. Pat. No. 2,375,963 (Thomas), U.S. Pat. No. 4,270,841 (R. L. Saxe), and GB Patent No 433,455. The polyiodide crystals known by these patents are each produced by selecting one from pyrazine carboxylic acids and pyridine carboxylic acids, and causing the selected acid to react with iodide, chlorine or bromine so as to be turned to a polyhalide such as polyiodide, polychloride or polybromide. The polyhalide is a complex compound obtained by causing a halogen atom to react with an inorganic or organic material. Details of the production process thereof are disclosed in, for example, U.S. Pat. No. 4,422,963 given to Saxe.

In the step of synthesizing the light control particles, in order to make the light control particles into an even size and improve the dispersibility of the light control particles in the specified dispersing medium, it is preferred to use, as the polymeric dispersing agent, a polymeric material such as nitrocellulose, as disclosed by Saxe. However, when nitrocellulose is used, crystals covered with nitrocellulose are obtained. According to the use of such crystals as the light control particles, the light control particles may not float in the droplets separated at the time of the phase separation, so as to remain in the resin matrix. In order to prevent this, it is preferred to use a silicone resin having a substituent with an ethylenically unsaturated bond as the resin (A) having a substituent with an ethylenically unsaturated bond, which is the polymeric medium. The use of the silicone resin makes it possible that the light control particles are easily dispersed and floated in fine droplets formed by the phase separation in the production of the film. As a result, the film can obtain a better variability.

Besides the light control particles above, use may be made of, for example, an inorganic fiber such as carbon fiber, a phthalocyanine compound such as τ type metal-free phthalocyanine or a metal phthalocyanine, or the like. Examples of the central metal in the phthalocyanine compound include copper, nickel, iron, cobalt, chromium, titanium, beryllium, molybdenum, tungsten, aluminum, chromium, and the like.

In the invention, the size of the light control particles is preferably 1 μm or less, more preferably from 0.1 to 1 μm, even more preferably from 0.1 to 0.5 μm. When the size of the light control particles is 1 μm or less, light is not easily scattered thereon and further, at the time of applying an electric field, an orientation movement thereof is decreased in the light control suspension. This matter and some other matter make it possible to avoid a problem that the transparency may be declined. The size of the light control particles is defined as the value of the volume-average particle diameter measured with a submicron particle analyzer (for example, trade name: N4MD, manufactured by Beckman Coulter, Inc.) according to photon correlation spectrometry.

The light control suspension used in the invention is preferably composed of 1 to 70% by mass of the light control particles and 30 to 99% by mass of the dispersing medium, and is more preferably composed of 4 to 50% by mass of the light control particles and 50 to 96% by mass of the dispersing medium.

In the invention, the refractive index of the polymeric medium is preferably close to that of the dispersing medium. Specifically, the difference between refractive indexes of the polymeric medium and the dispersing medium in the invention is preferably 0.005 or less, more preferably 0.003 or less.

The light control material contains the light control suspension in an amount usually from 1 to 100 parts by mass, preferably from 6 to 70 parts by mass, more preferably from 6 to 60 parts by mass for 100 parts by mass of the polymeric medium.

<Transparent Electroconductive Resin Substrates>

In general, the transparent electroconductive resin substrates used when the light control material according to the invention is used to produce a light control film may each generally be a transparent electroconductive resin substrate wherein: a transparent resin substrate is coated with a transparent electroconductive film (an ITO, $SnO_2$, $In_2O_3$ or organic electroconductive film, or some other film); the total transmittance of the transparent resin substrate and the transparent electroconductive layer combined is 80% or more; and a surface resistance value within the range of 3 to 3000Ω is exhibited. The light transmittance of the transparent electroconductive resin substrate may be measured according to the method for measuring total light ray transmittance in JIS K7150. The transparent resin substrate may be, for example, a polymeric film and the like.

The polymeric film above is, for example, a film of a polyester such as polyethylene terephthalate, a film of a polyolefin such as polypropylene, a polyvinyl chloride film, acrylic resin film, a polyethersulfone film, a polyarylate film, a polycarbonate film, or some other resin film. A polyethylene terephthalate film is preferred since the film is excellent in transparency, formability, bendability, workability, and others.

The thickness of the transparent electroconductive film with which the transparent resin substrate is coated is preferably within the range of 10 to 5,000 nm. The thickness of the transparent resin substrate is not particularly limited. When the substrate is, for example, a polymeric film, the thickness is preferably within the range of 10 to 200 μm. In order to prevent a short-circuit phenomenon generated by a matter that the gap between the transparent resin substrates is narrow so that the incorporation of a contaminant and others are generated, it is allowable to use transparent electroconductive resin substrates in each of which a transparent insulating layer having a thickness within the range of several nanometers to about 1 μm is formed on a transparent electroconductive film. When the light control film of the invention is used in a reflective-type light control window (in, for example, a rear viewing mirror for cars, and the like), a thin film in an electroconductive metal such as aluminum, gold or silver, which is a reflecting body, may be used directly as an electrode.

<Light Control Film>

The light control film of the invention has two transparent electroconductive resin substrates each having a transparent electroconductive film and a transparent resin substrate, and a light control layer sandwiched between the transparent electroconductive film sides of the two transparent electroconductive resin substrates, and further the light control layer has a primer layer over the transparent electroconductive film surface of at least one of the two transparent electroconductive resin substrates.

The light control layer may be formed by use of a light control material. The light control material is composed of a resin matrix made of a polymeric medium, and a light control suspension dispersed in the resin matrix.

In the invention, a cutting line for a picture, a character or some other is made in the transparent electroconductive film of the one transparent electroconductive resin substrate having the primer layer, and further a start point for the cutting and an end point for the cutting make a closed region to insulate the region of the picture or character electrically from the surrounding region of the transparent electroconductive film of the transparent electroconductive resin substrate, whereby the light transmittance of the region having the design such as the character or picture can be freely varied from the other region.

The manner for making the cutting line in the transparent electroconductive film is as described above. Specific examples thereof include (1) a manner of forming a transparent electroconductive film onto a transparent resin substrate to prepare a transparent electroconductive resin substrate, then making a cutting line from the transparent electroconductive film side, and finally forming a primer layer, (2) a manner of making the cutting line from the transparent resin substrate side toward the transparent electroconductive film after forming a transparent electroconductive film onto a substrate to prepare a transparent electroconductive resin substrate, or after forming a light control film, and (3) a manner of making the cutting line from the primer layer side toward the transparent electroconductive film after forming a transparent electroconductive film onto a transparent resin substrate to prepare a transparent electroconductive resin substrate and then forming a primer layer, as well as before forming a light control layer.

In order to yield the light control film, a liquid light control suspension is first mixed with a polymeric medium into a homogeneous form to yield a light control material made of a mixed liquid wherein the light control suspension is dispersed, in the state of droplets, in the polymeric medium.

Specifically, this process is as follows: A liquid wherein light control particles are dispersed in a solvent is mixed with a dispersing medium for a light control suspension, and then the solvent is distilled off by means of a rotary evaporator or the like to prepare a light control suspension.

Next, the light control suspension and a polymeric medium are mixed with each other to prepare a mixed liquid (light control material) wherein the light control suspension is dispersed, in the state of droplets, in the polymeric medium.

This light control material is applied into a constant thickness onto a transparent electroconductive film of a transparent electroconductive resin substrate having a primer layer, and optionally the solvent contained in the light control material is dried and removed. A high-pressure mercury lamp or the like is then used to radiate ultraviolet rays thereto, thereby curing the polymeric medium. As a result, a light control layer is formed wherein the light control suspension is dispersed, in the form of droplets, in a resin matrix made of the cured polymeric medium.

By changing the blend ratio between the polymeric medium and the light control suspension variously, the light transmittance of the light control layer can be adjusted. A transparent electroconductive film of another transparent electroconductive resin substrate, preferably a transparent electroconductive film of a transparent electroconductive resin substrate having a primer layer is caused to adhere closely to the light control layer formed as described above, thereby yielding a light control film. It is allowable to form a primer layer on transparent electroconductive film of each of two transparent electroconductive resin substrates or one of the substrates, form a light control layer on each of two primer layers, or on each of the primer layer and the transparent electroconductive film, and then laminate these workpieces onto each other to cause the light control layers to adhere closely onto each other. The thickness of the light control layer(s) is preferably within the range of 5 to 1,000 μm, more preferably within the range of 20 to 100 μm.

The size of the droplets (the average droplet diameter) of the light control suspension dispersed in the resin matrix is usually from 0.5 to 100 μm, preferably from 0.5 to 20 μm, more preferably from 1 to 5 μm. The size of the droplets is decided in accordance with the concentrations of the individual components that constitute the light control suspension, the viscosities of the light control suspension and the polymeric medium, the compatibility of the dispersing medium in the light control suspension with the polymeric medium, and others. The average droplet diameter can be calculated, for example, by using an SEM to take a photograph or some other image of the light control film along one of the surface directions, measuring the diameters of arbitrarily-selected plural droplets, and then getting the average value thereof. The diameter can also be calculated by taking a viewing field image of the light control film through an optical microscope, as digital data, into a computer, and then applying an image processing integration software thereto.

The primer treatment (the formation of the primer layer) onto (one or each of) the transparent electroconductive resin substrates in the invention can be conducted, for example, by applying the material for forming the primer layer onto the transparent electroconductive film of the transparent electroconductive resin substrate, using a bar coater method, a Mayer bar coater method, an applicator method, a doctor blade method, a roll coater method, a die coater method, a comma coater method, a gravure coater method, a microgravure coater method, a roll brush method, a spray coating method, an air knife coating method, an impregnation method, a curtain coating method and others alone or in combination. At the time of the applying, it is allowable to dilute the material for forming the primer layer optionally with an appropriate solvent, and then use the solution of the material for forming the primer layer. When the solvent is used, it is necessary to dry the resultant after applying the solution onto the transparent electroconductive resin substrate. As the need arises, the applied film which is to be the primer layer, may be formed onto only a single surface (on the transparent electroconductive film side) of the transparent electroconductive resin substrate, or onto each surface of the substrate by an immersing method or dip coating method.

The solvent used to form the primer layer may be any solvent that is a solvent wherein the material for forming the primer layer is dissolved or dispersed, and that can be removed by drying or the like after the formation of the primer layer. Examples thereof include isopropyl alcohol, ethanol, methanol, 1-methoxy-2-propanol, 2-methoxyethanol, cyclohexanone, methyl isobutyl ketone, anisole, methyl ethyl ketone, acetone, tetrahydrofuran, toluene, heptane, cyclohexane, ethyl acetate, propylene glycol monomethyl ether acetate, diethyl diglycol, dimethyl diglycol, isoamyl acetate, hexyl acetate, and the like. A mixed solvent thereof may be used.

For the applying of the light control material, which is to be the light control layer, use is made of a known applying means such as a bar coater, an applicator, a doctor blade, a roll coater, a die coater, or a comma coater. The light control material is applied onto the primer layer laid on the transparent electroconductive film of each of the transparent electroconductive resin substrates. Alternatively, in the case of using transparent electroconductive resin substrates one of which has no primer layer, the light control material may be applied directly onto the transparent electroconductive film of the transparent electroconductive resin substrate. At the time of the applying, the light control material may be diluted with an appropriate solvent as the need arises. When the solvent is used, it is necessary that after the diluted light control material is applied onto the transparent electroconductive film of each of the transparent electroconductive resin substrates, the substrate be dried.

The solvent used for applying the light control material may be tetrahydrofuran, toluene, heptane, cyclohexane, ethyl acetate, ethanol, methanol, isoamyl acetate, hexyl acetate, or the like. In order to form a light control layer wherein the liquid light control suspension is dispersed, in the form of fine droplets, in the solid resin matrix, use may be made of a method of using a homogenizer, an ultrasonic homogenizer, or the like to mix components of the light control material with each other to disperse the light control suspension into the polymeric medium, a phase separation method based on the polymerization of the resin component(s) in the polymeric medium, a phase separation method based on the volatilization of the solvent contained in the light control material, a phase separation method depending on temperature, or some other method.

According to the above-mentioned process, a light control film can be provided wherein the light transmittance can be adjusted at will by the formation of an electric field. Even when no electric field is formed, this light control film is kept in a vividly colored state, wherein no light is scattered. When an electric field is formed, the film is converted into a transparent state. This capability exhibits a property that 200000 or more reversible repetitions can be attained. In order to promote the light transmittance in the transparent state, and promote the vividness in the colored state, it is preferred to make the refractive index of the liquid light control suspension equal to that of the resin matrix. About the power source used to operate the light control film, an alternating current may be used, and the voltage thereof may be from 10 to 100 volts (effective value), and the frequency thereof may be in the range of 30 Hz to 500 kHz. About the light control film of the invention, the response time to the electric field may be set into the range of 1 to 50 seconds when the film is caused to give no color, and the time may be set into the range of 1 to 100 seconds when the film is caused to give a color. About the endurance against ultraviolet rays, results of an ultraviolet radiating test using ultraviolet rays of 750 W power, and others demonstrate that a stable variability is exhibited even after the lapse of 250 hours. Even when the film is allowed to stand still at −50 to 90° C. over a long period, the initial variability can be maintained.

When use is made of a method based on a water-used emulsion in the production of a light control film wherein a liquid crystal is used in the prior art, the liquid crystal reacts with water so that the light control property is lost in many cases. Thus, there is caused a problem that films having the same properties are not easily produced. In the invention, use is made of not any liquid but a liquid-form light control suspension in which light control particles are dispersed; thus, even when no electric field is applied thereto, the light control film does not cause light to be scattered and the film is in such a colored state that the vividness is excellent and no limitation is imposed onto the viewing angle, this situation being different from situations according to the liquid-crystal-used light control films. By adjusting the content by percentage of the light control particles, adjusting the droplet form or the film thickness, or adjusting the electric field intensity, the light variation degree can be adjusted at will. In the light control film of the invention, no liquid crystal is used; therefore, the following are also overcome: a change in the color tone and a decrease in the variability power that are based on the irradiation with ultraviolet rays; and a response time lag following a voltage drop generated between the periphery of the transparent resin substrates and the center thereof, the lag being peculiar to large-sized products.

When no electric field is applied to the light control film according to the invention, the film turns in a vividly colored state because of light absorption and dichroic effect of the light control particles on the basis of the Brownian movement of the light control particles in the light control suspension. However, when an electric field is applied thereto, the light control particles in the droplets or associated droplets are arranged in parallel to the electric field, so that the film is converted into a transparent state. Meanwhile, the electroconductive film region having the design such as the picture or character, is electrically insulated from the surrounding region of the electroconductive film, whereby the light transmittance of the light control layer region having the design such as the picture or character, gives a colored state. When an electroconductive line is given to be connected to the electroconductive film region having the design such as the picture or character, the region can have a light control function so as to give a behave different from that of the light control layer region around the picture, character or the like.

Since the film of the invention is in a film state, the film solves the problems of light control glass in the prior art, wherein a liquid light control suspension is used as it is, that is, the following problems: the liquid suspension is not easily injected between its two transparent electroconductive resin substrates; a difference in hydraulic pressure between the upper and lower regions of the product easily causes an expansion phenomenon of the lower region; and in accordance with the external environment, for example, the pressure of wind and the like, the gap between the substrates is changed so that the color phase is locally changed; or any sealing member between the transparent electroconductive resin substrates is broken so that the light control material leaks.

In a case of a light control window according to the prior art wherein a liquid crystal is used, the liquid crystal is easily deteriorated by ultraviolet rays and further the range of the use temperature thereof is also narrow because of thermal properties of the liquid crystal, which is nematic. Furthermore, about optical properties thereof also, the following problems are caused: when no electric field is applied thereto, the window is turned in a milk-white semi-transparent state by light scattering; and even when an electric field is applied thereto, the window is not completely turned vivid so that the opacified state remains. Accordingly, such a light control window cannot attain a display function based on the blocking and transmission of light, which is used as an action principle in existing liquid crystal display elements. However, the use of the light control film of the invention makes it possible to solve such problems.

The light control film of the invention is a light control film in which a primer layer is formed on at least one of transparent electroconductive films of two transparent electroconductive resin substrates, a cutting line for a picture or character is made only in the transparent electroconductive film of the one transparent electroconductive resin substrate having the prime layer, and a start point for the cutting and an end point for the cutting make a closed region, whereby the region of the picture or character is electrically insulated from the surrounding region of the transparent electroconductive film of the transparent electroconductive resin substrate so that the light transmittance of only the partial region of the light control film can be controlled.

The light control film of the invention can be preferably used for, e.g., an indoor or outdoor partition; a window glass plate or skylight for building; various flat display elements used in the electronic industry and for imaging instruments; alternate products for various gauge boards and existing liquid crystal display elements; a light shutter; various indoor and outdoor advertisement- and guide-indicating boards; window glass plates for an aircraft, a railway vehicle and a ship; window glass plates, a back mirror and a sun roof for a car; glasses; sunglasses; a sun visor; and other articles.

The using manner of the light control film of the invention may be a direct use of the film. In accordance with an article to which the invention is applied, for example, the light control film of the invention may be used in the state that the film is sandwiched between two substrates, or in the state that the film is adhered onto a single surface of a substrate. The substrate(s) may (each) be, for example, a glass plate, or a polymeric film equivalent to the above-mentioned transparent resin substrates.

The structure and the operation of the light control film according to the invention will be described in more detail with reference to the drawings.

FIG. 1 is a schematic view of the structure of a light control film of an embodiment of the invention. A light control layer 1 is sandwiched between two transparent electroconductive resin substrates 4, which are composed of two transparent resin substrates 5b each of which is coated with a transparent electroconductive film 5a. A primer layer 6 is arranged between the light control layer 1 and each of the transparent electroconductive resin substrates 4. By switching a switch 8, a power source 7 is connected or disconnected to the two transparent electroconductive films 5. The light control layer 1 is composed of the following: a film-form resin matrix 2, as a polymeric medium, obtained by curing the resin (A) having a substituent with an ethylenically unsaturated bond, with ultraviolet rays; and a liquid-form light control suspension dispersed, in the form of droplets 3, in the resin matrix 2.

Figure 2:
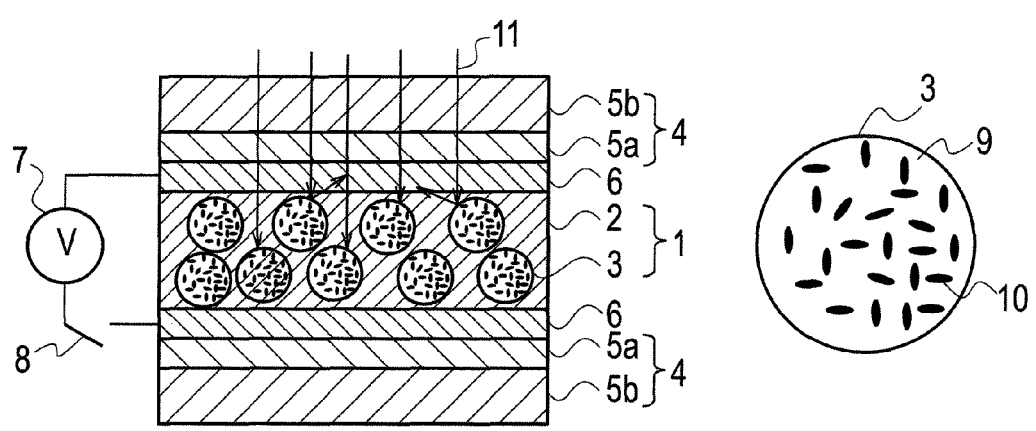
FIGS. 2(a) and 2(b) are each a schematic view referred to in order to describe the action of the light control film in FIG. 1 when no electric field is applied thereto.
Figure 3:
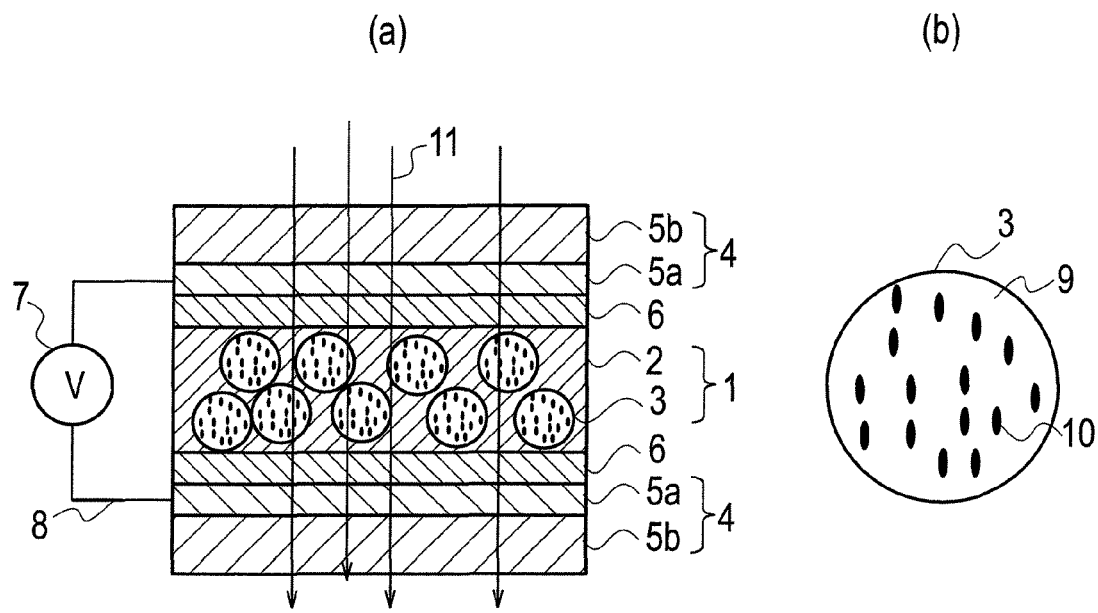
FIGS. 3(a) and 3(b) are each a schematic view referred to in order to describe the action of the light control film in FIG. 1 when an electric field is applied thereto.

FIG. 2 are each a schematic view referred to in order to describe the operation of the light control film illustrated in FIG. 1, and each illustrate a case where the switch 8 is turned off to apply no electric field. In this case, incident rays 11 are absorbed, scattered or reflected in or on light control particles 10, which are dispersed in a dispersing medium 9 constituting the droplets 3 of the liquid-form light control suspension, by the Brownian movement of the light control particles 10. Thus, the rays 11 cannot be transmitted. As illustrated in FIG. 3, however, when the switch 8 is connected so as to apply an electric field, the light control particles 10 are arranged in parallel to an electric field formed by the applied electric field so that the incident rays 11 come to pass between the arranged light control particles 10. In this way, a light transmitting function which causes neither scattering nor a decrease in the transparency is produced.

EXAMPLES

The invention will be more specifically described by way of Examples of the invention and Comparative Examples hereinafter. However, the invention is not limited into these Examples.
(Production Example of Light Control Particles)

In order to produce light control particles, in a 500 mL four-necked flask equipped with a stirrer and a condenser tube, 4.5 g of iodide (JIS extra pure reagent, manufactured by Wako Pure Chemical Industries, Ltd.) was dissolved in a solution composed of 87.54 g of a 15% by mass solution of nitrocellulose (trade name: 1/4 LIG, manufactured by Bergerac NC Co.) diluted with isoamyl acetate (extra pure reagent, manufactured by Wako Pure Chemical Industries, Ltd.), 44.96 g of isoamyl acetate, 4.5 g of dehydrated $CaI_2$ (for chemistry, manufactured by Wako Pure Chemical Industries, Ltd.), 2.0 g of anhydrous ethanol (for organic synthesis, manufactured by Wako Pure Chemical Industries, Ltd.), and 0.6 g of purified water (purified water, manufactured by Wako Pure Chemical Industries, Ltd.). Thereto was then added 3 g of pyrazine-2,5-dicarboxylic acid dihydrate (manufactured by PolyCarbon Industries), which was a base-forming material of the light control particles.

The resultant was stirred at 45° C. for 3 hours to terminate the reaction. Thereafter, any solid component therein was dispersed by means of an ultrasonic disperser for 2 hours. At this time, the color tone of the mixed liquid changed from brown to navy blue. Next, in order to take out light control particles having specified sizes from the reaction solution, a centrifugal separator was used to separate other light control particles. The reaction solution was centrifuged at a rate of 750G for 10 minutes to remove the precipitation. Furthermore, the solution was centrifuged at a rate of 7390 G for 2 hours to remove the floated materials, and the precipitation particles were collected. The precipitation particles were made of a needle crystal having an average particle diameter of 0.36 μm, the diameter being measured by means of a submicron particle analyzer (product name: N4MD, manufactured by Beckman Coulter, Inc.). The precipitation particles were the light control particles.
(Production Example of a Light Control Suspension)

45.5 g of the light control particles yielded in the above (Production example of light control particles) was added to, as a dispersing medium of light control suspension, 50 g of a copolymer of butyl acrylate (Wako extra pure reagent, manufactured by Wako Pure Chemical Industries, Ltd.)/2,2,2-trifluoroethyl methacrylate (for industry, manufactured by Kyoeisha Chemical Co., Ltd.)/2-hydroxyethyl acrylate (Wako first class reagent, manufactured by Wako Pure Chemical Industries, Ltd.) (ratio by mole between the monomers: 18/1.5/0.5, weight-average molecular weight: 2,000, refractive index: 1.4719), and then a stirrer was used to mix the components with each other for 30 minutes. Next, a rotary evaporator was used to remove isoamyl acetate at 80° C. in a vacuum having a reduced pressure of 133 Pa for 3 hours to produce a stable liquid-form light control suspension wherein there was not caused a phenomenon that the light control particles precipitated and aggregated.
(Production Example of an Energy-Beam-Curable Silicone Resin)

Into a four-necked flask equipped with a Dean-Stark trap, a condenser tube, a stirrer and a heating device were charged 17.8 g of silanol-both-terminated polydimethylsiloxane (reagent, manufactured by Chisso Corp.), 62.2 g of silanol-both-terminated polydimethyldiphenylsiloxane (reagent, manufactured by Chisso Corp.), 20 g of (3-acryloxypropyl) methyldimethoxysilane (reagent, manufactured by Chisso Corp.), and 0.1 g of 2-ethylhexanetin (manufactured by Wako Pure Chemical Industries, Ltd.). In heptane, the solution was refluxed at 100° C. for 3 hours to conduct a reaction. Next, thereto was added 25 g of trimethylethoxysilane (reagent, manufactured by Chisso Corp.), and the resultant was refluxed for 2 hours to cause a dealcoholization reaction, and then a rotary evaporator was used to remove heptane in a vacuum having a reduced pressure of 100 Pa at 80° C. for 4 hours to yield an energy-beam-curable silicone resin having a weight-average molecular weight of 35000, and a refractive index of 1.4745. From the hydrogen integrated-intensity ratio according to NMR, the concentration of ethylenically unsaturated bonds in this resin was 0.31 mol/kg. The ethylenically unsaturated bond concentration was measured by a method described below.

[Method for Measuring the Ethylenically Unsaturated Bond Concentration]

The ethylenically unsaturated bond concentration (mol/kg) was calculated from the hydrogen integrated-intensity ratio according to NMR (using an integrated value of hydrogen in the ethylenically unsaturated bonds near 6 ppm, an integrated value of hydrogen in phenyl groups near 7.5 ppm, and an integrated value of hydrogen in methyl groups near 0.1 ppm). $CDCl_3$ was used as the solvent for the measurement. In the resin produced as described above, the ratio by mass calculated out from the hydrogen integrated-intensity ratio according to NMR was as follows: the methyl groups/the phenyl groups/the ethylenically unsaturated groups was 11/6.4/1. The proportion of the ethylenically unsaturated groups in the whole was 5.4%, and the number of the ethylenically unsaturated bond groups per molecule was 9.35 from the individual molecular weights. Thus, the mole number per kilogram was calculated into 0.31 mol/kg.

Example 1

2.5 g of the light control suspension yielded in the above (Production example of a light control suspension) was added to 10 g of the energy-beam-curable silicone resin yielded in the above (Production example of an energy-beam-curable silicone resin), 0.2 g of bis(2,4,6-trimethylbenzoyl)phenylphosphine oxide (Ciba Specialty Chemicals Inc.) as a photopolymerization initiator, and 0.3 g of dibutyltin dilaurate as a coloration inhibitor, and then the components were mechanically mixed with each other for 1 minute to produce a light control material.

Separately, an applicator method was used to apply, as a solution at the time of primer-layer-formation, a solution described below onto a transparent electroconductive film of a transparent electroconductive resin substrate made of a PET film (300R, manufactured by Toyobo Co., Ltd., thickness: 125 μm), which was coated with a transparent electroconductive film (thickness: 300 Å) made of ITO (indium tin oxide) and which had a surface electric resistance value of 200 to 700Ω in such a manner that the solution was applied onto the whole of the front surface of the transparent electroconductive film under a condition that the gap was 10 μm. The solution was a solution wherein a mixture of pentaerythritol triacrylate and pentaerythritol tetraacrylate (trade name: ARONICS M-305, manufactured by Toagosei Co., Ltd.) was dissolved in a mixed solution of methyl ethyl ketone and cyclohexanone (ratio therebetween: 1:1) to give a concentration of 5.0% by mass. The workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming a primer layer. At this time, a photopolymerization initiator (1-hydroxycyclohexyl phenyl ketone) was added thereto in an amount of 3% by mass of the product ARONICS M-305.

The thickness of the primer layer was 68 nm. The film thickness of the primer layer was measured by use of an instantaneous spectrophotometer F-20 (manufactured by Filmetrics Japan, Inc.).

The light control material yielded as described above was applied onto the whole of the surface of the above-mentioned primer-layer-formed transparent electroconductive resin substrate. Next, thereonto was laminated and closely adhered the similar transparent electroconductive resin substrate on which a primer layer was formed in the same way, so as to face the transparent electroconductive film thereof onto the light-control-material-applied layer. Metal halide lamps were then used to radiate ultraviolet rays, 3000 mJ/cm² in power, onto the transparent electroconductive resin substrates from the polyester film sides thereof. In this way, a light control film with 340 μm in thickness was produced, wherein a film-form light control layer with 90 μm in thickness, in which light control suspension was dispersed in the form of spherical liquid droplets in a matrix made of the resin cured by the ultraviolet rays, was sandwiched between the transparent electroconductive resin substrates.

Next, a cutting plotter, FC2250-60VC (manufactured by Graphtec Corp.), was used to make cuts (half cuts) for a logotype of Hitachi Chemical Co., Ltd. in only one of the transparent electroconductive resin substrates from the transparent resin substrate side of the one substrate to the transparent electroconductive film thereof. Furthermore, at each of two edge positions of this light control film, a half cut was made into a triangular form in each of the two transparent electroconductive resin substrates and further the light control layer was removed to make each of the transparent electroconductive films naked to attain electric conduction for the application of voltage (see FIG. 4). The size of the liquid droplets (average droplet diameter) of the light control suspension in the light control film was 3 μm on average.

An alternating voltage of 100 V, 50 Hz in frequency, was applied to these naked electrodes, and measurements were made about the light transmittance of light control film in the regions inside the cutting lines in the light control film, and that in the region outside the cutting lines therein.

The results are shown in Table 1.

Figure 4:
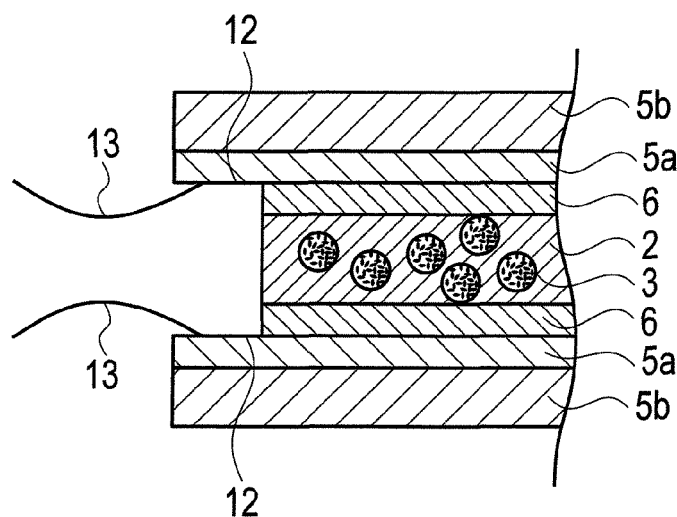
FIG. 4 is a schematic view referred to in order to describe a state of an end region of the light control film. Illustration of light control particles 10 in droplets 3 is omitted.

With the naked eye, the edge regions of the light control film (regions where the light control layer was removed to make the transparent electroconductive films naked) were observed. As a result, curves of the transparent electroconductive resin substrates toward the center in the thickness direction of the light control film were very small (FIG. 4).

[Method for Measuring the Light Transmittance of the Light Control Film]

A spectroscopic color-difference meter SZ-Σ90 (manufactured by Nippon Denshoku Industries Co., Ltd.) was used to measure the Y value (%) in the state that the used light source was an A light source and the viewing angle was set to 2 degrees. The Y value was defined as the light transmittance. The light transmittance was measured at each of the time when an electric field was applied to the film (the electric-field-applying time) and the time when no electric field was applied thereto (non-electric-field-applying time).

TABLE 1

| | Light transmittance (%) at electric-field-applying time | | Light transmittance (%) at non-electric-field-applying time | |
|---|---|---|---|---|
| | Inside | Outside | Inside | Outside |
| Example 1 | 47 | 1.0 | 1.0 | 1.0 |

FIG. 5(a) shows a photograph of the front surface state of the light control film yielded in Example 1 at the non-electric-field-applying time, and FIGS. 5(b) and 5(c) show a photograph of the rear surface state thereof at the non-electric-field-applying time, and one of the front surface thereof at the electric-field-applying time, respectively.

Figure 5:
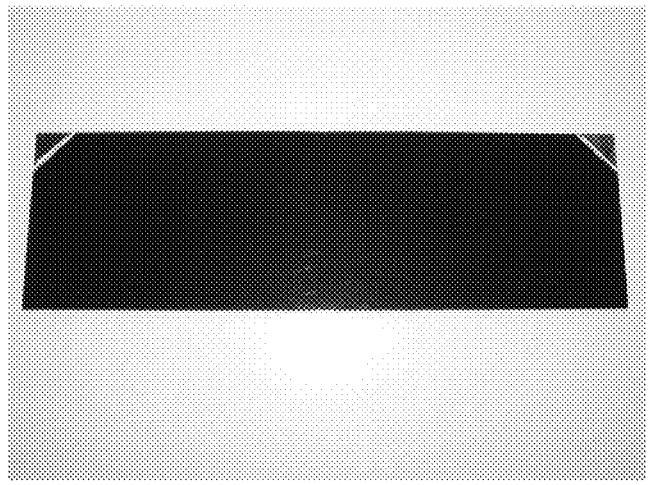
FIGS. 5(a), 5(b) and 5(c) show external appearances of a light control film of Example 1 when an electric field is applied thereto and when no electric field is applied thereto.
Figure 5:
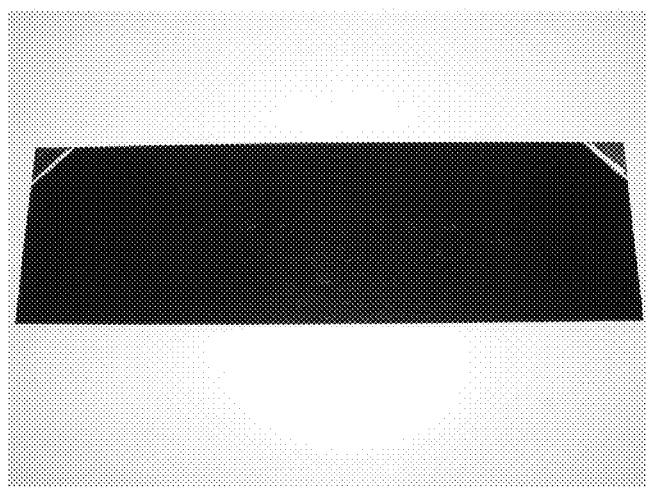
Figure 5:

As shown in Table 1 and FIG. 5, even at the voltage-applying time, the light transmittance of the regions inside the cutting lines was equal to that at the non-voltage-applying time so that the light control film was not driven at all. Thus, between the insides of the figures (logotype) of the cutting lines and the outside thereof, the light transmittance was able to be varied to give a good contrast. As described herein, it was possible to provide a method for producing, with ease, a light control film rich in formability of a design such as a character or picture.

Comparative Example 1

Cuts (half cuts) for a logotype of Hitachi Chemical Co., Ltd. were made in the same way as in Example 1 except that only transparent electroconductive resin substrates each having no primer layer were used.

FIG. 6(a) shows a photograph of the front surface state of the light control film yielded in Comparative Example 1 at the non-electric-field-applying time, and FIGS. 6(b) and 6(c) show a photograph of the rear surface state thereof at the non-electric-field-applying time, and one of the front surface thereof at the electric-field-applying time, respectively.

Figure 6:
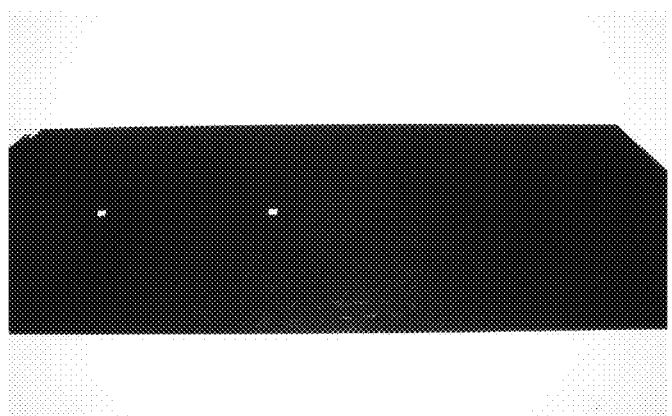
FIGS. 6(a), 6(b) and 6(c) show external appearances of a light control film of Comparative Example 1 when an electric field is applied thereto and when no electric field is applied thereto.
Figure 6:
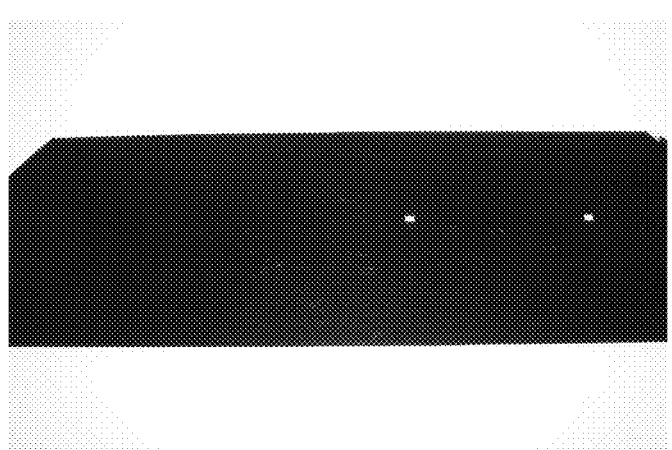
Figure 6:

As is understood from FIG. 6, when the blade of the cutting plotter was pulled up, peels were unfavorably generated between the light control layer and the transparent electroconductive resin substrates at small corners since the adhesiveness therebetween was poor.

Comparative Example 2

Cuts (half cuts) for a logotype of Hitachi Chemical Co., Ltd. were made in the same way as in Example 1 except that only transparent electroconductive resin substrates each having no primer layer were used, and further the light control film was fully cut into a size of 9 cm×20 cm to surround the logotype.

Figure 7:
FIG. 7 shows details of the external appearance of the rear surface of a light control film of Comparative Example 2 when no electric field is applied thereto.

FIG. 7 shows details of the rear surface of the light control film yielded in Comparative Example 2 at the non-electric-field-applying time.

As is understood from FIG. 7, poor was the adhesiveness between the light control layer and the transparent electroconductive resin substrates; thus, the whole of the transparent electroconductive resin substrates were out of positions, so that the cutting lines made in the transparent electroconductive resin substrate were unfavorably shifted from those made in the light control layer.

Example 2

A square cut (half cut) was made in the same way as in Example 1 except that as the device used to make the cut, use was made of a laser marker (3-Axis YVO4 LASER MARKER, MD-V9910, manufactured by Keyence Corp.; wavelength: 1064 nm). At this time, the cut line was drawn at a laser power of 30% (peak power: 100 kW) and a scan speed of 1000 m/s.

Even at the voltage-applying time, the light transmittance of the region inside the cutting line was equal to that at the non-voltage-applying time so that the light control film was not driven at all. Thus, between the inside of the square of the cutting line and the outside thereof, the light transmittance was able to be varied to give a good contrast.

Figure 8:
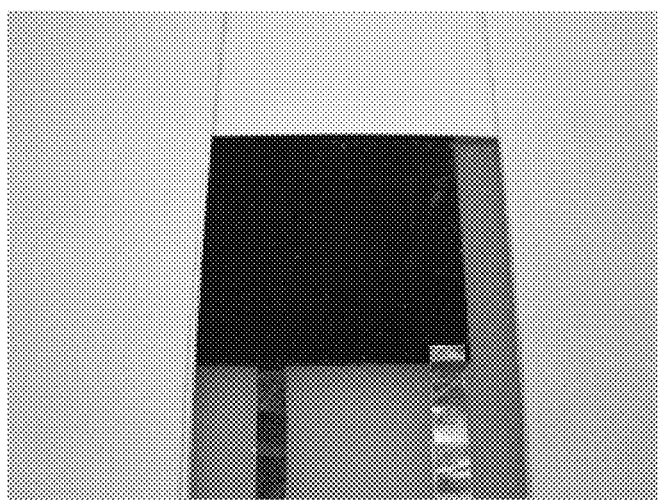
FIGS. 8(a), 8(b) and 8(c) show external appearances of a light control film of Example 2 when an electric field is applied thereto and when no electric field is applied thereto.
Figure 8:
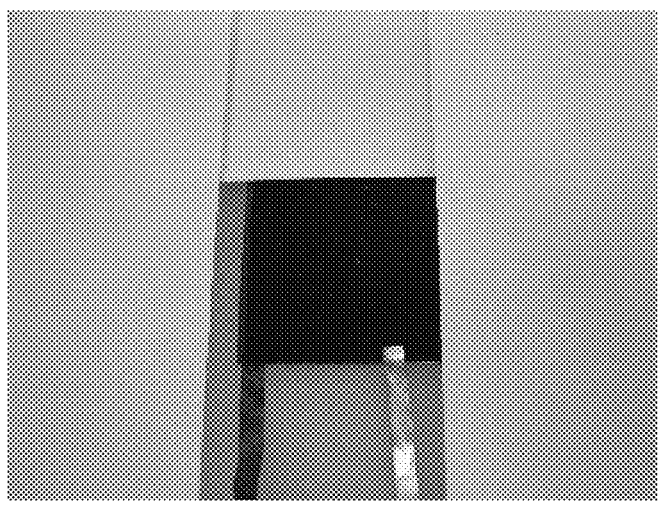
Figure 8:
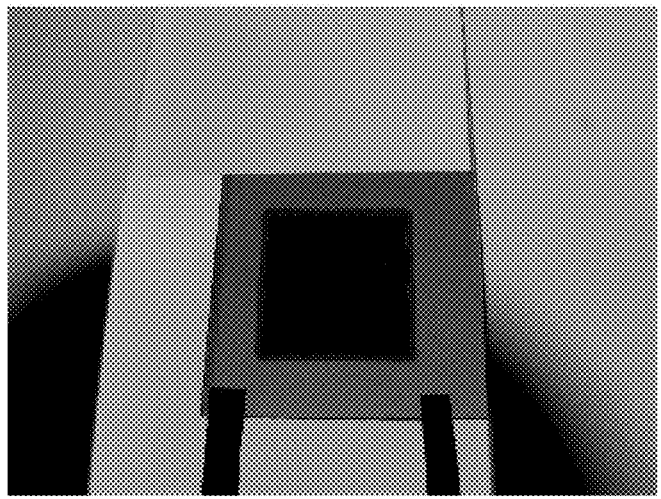

FIG. 8(a) shows a photograph of the front surface state of the light control film yielded in Example 2 at the non-electric-field-applying time, and FIGS. 8(b) and 8(c) show a photograph of the rear surface state thereof at the non-electric-field-applying time, and one of the front surface thereof at the electric-field-applying time, respectively.

Table 2 shows the light transmittance of the inside of the half-cut figure and that of the outside thereof at the voltage-applying time, and those at the non-voltage-applying time together.

TABLE 2

|  | Light transmittance (%) at electric-field-applying time | | Light transmittance (%) at non-electric-field-applying time | |
| --- | --- | --- | --- | --- |
|  | Inside | Outside | Inside | Outside |
| Example 2 | 49 | 1.2 | 1.2 | 1.2 |

Example 3

Cuts (half cuts) for a logotype of Hitachi Chemical Co., Ltd. were made in the same way as in Example 1 except that as the solution when the primer layers were formed, use was made of a solution wherein a product, AY42-151 (manufactured by Dow Corning Toray Co., Ltd.), which is made mainly of a urethane acrylate containing a pentaerythritol skeleton and an IPDI skeleton, was dissolved into a mixed solvent of 1-methoxy-2-propanol and ethanol (ratio therebetween: 7:3) to give a concentration of 2.0% by mass. The thickness of each of the primer layers was 45 nm.

Even at the voltage-applying time, the light transmittance of the regions inside the cutting lines was equal to that at the non-voltage-applying time so that the light control film was not driven at all. Thus, between the insides of the cutting lines and the outside thereof, the light transmittance was able to be varied to give a good contrast.

FIG. 9(a) shows a photograph of the cut-made front surface state of the light control film yielded in Example 3 at the non-electric-field-applying time, and FIGS. 9(b) and 9(c) show a photograph of the state of the rear of the cut-made front surface thereof at the non-electric-field-applying time, and one of the front surface thereof at the electric-field-applying time, respectively.

Figure 9:
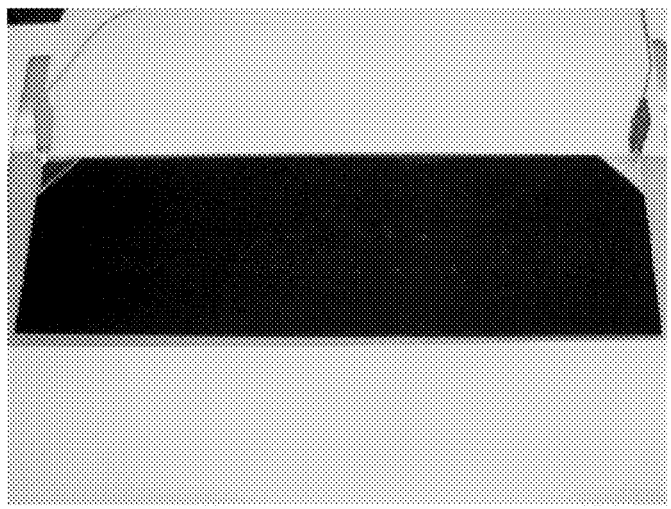
FIGS. 9(a), 9(b) and 9(c) show external appearances of a light control film of Example 3 when an electric field is applied thereto and when no electric field is applied thereto.
Figure 9:
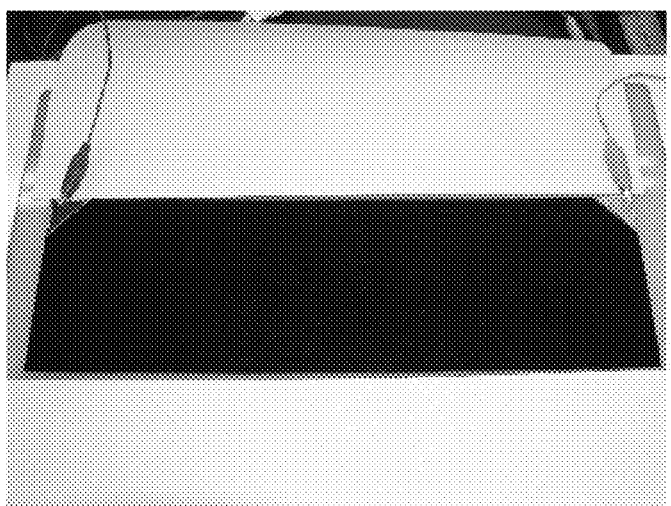
Figure 9:

As is understood from FIG. 9, even at the voltage-applying time, the light transmittance of the regions inside the cutting lines was equal to that at the non-voltage-applying time so that the light control film was not driven at all. Thus, between the insides of the cutting lines and the outside thereof, the light transmittance was able to be varied to give a good contrast.

Example 4

A circular cut (half cut) was made in the same way as in Example 1 except that as the solution when the primer layers were formed, use was made of a solution wherein a pentaerythritol triacrylate toluenediisocyanate urethane prepolymer (trade name: UA-306I, manufactured by Kyoeisha Chemical Co., Ltd.) was dissolved into a mixed solvent of methyl ethyl ketone and cyclohexanone (ratio therebetween: 1:1) to give a concentration of 5.0% by mass. The thickness of each of the primer layers was 79 nm.

Even at the voltage-applying time, the light transmittance of the region inside the cutting line was equal to that at the non-voltage-applying time so that the light control film was not driven at all. Thus, between the inside of the cutting line and the outside thereof, the light transmittance was able to be varied to give a good contrast.

FIG. 10(a) shows a photograph of the cut-made front surface state of the light control film yielded in Example 4 at the non-electric-field-applying time, and FIGS. 10(b) and 10(c) show a photograph of the state of the rear of the cut-made front surface thereof at the non-electric-field-applying time, and one of the front surface at the electric-field-applying time, respectively.

Figure 10:
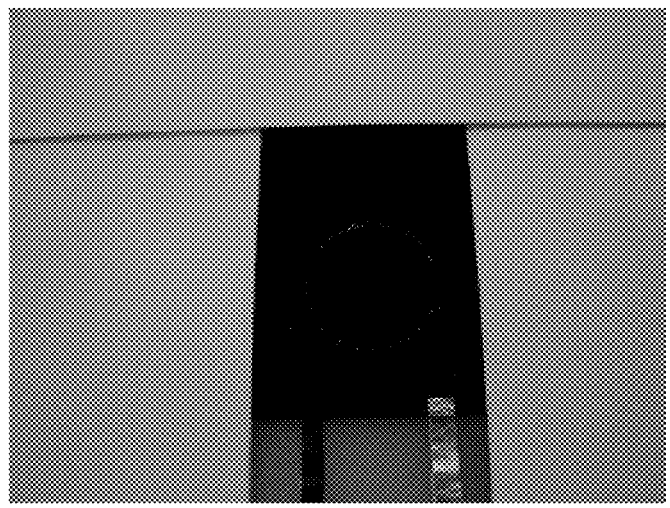
FIGS. 10(a), 10(b) and 10(c) show external appearances of a light control film of Example 4 when an electric field is applied thereto and when no electric field is applied thereto.
Figure 10:
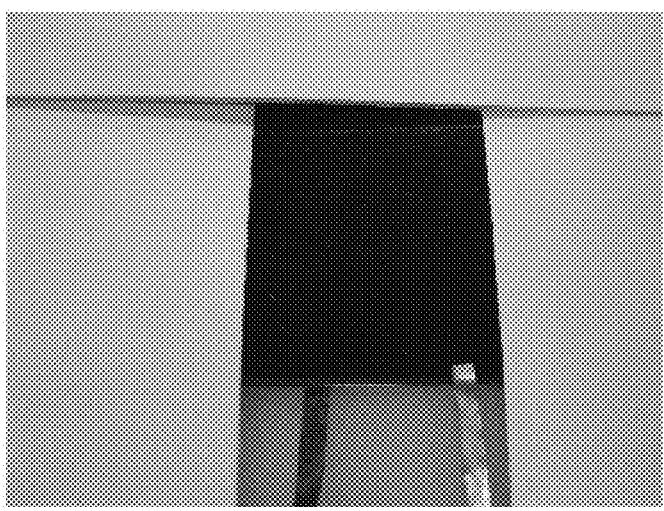
Figure 10:
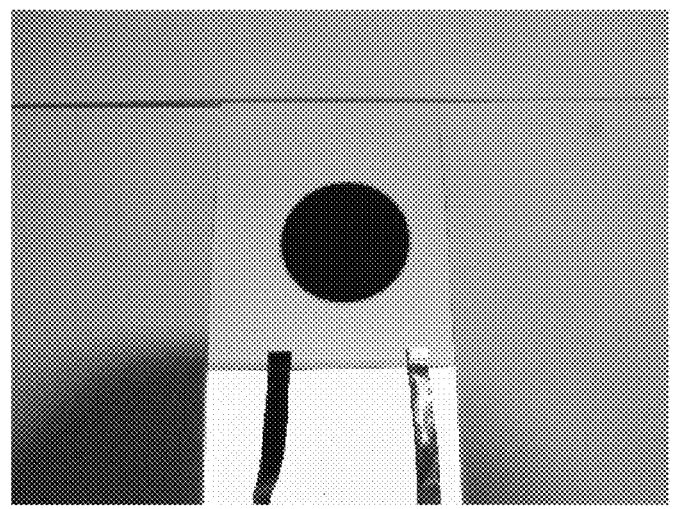

As is understood from FIG. 10, even at the voltage-applying time, the light transmittance of the region inside the cutting line was equal to that at the non-voltage-applying time so that the light control film was not driven at all. Thus, between the inside of the cutting line and the outside thereof, the light transmittance was able to be varied to give a good contrast.

Table 3 shows, about each of Examples 3 and 4, the light transmittance of the inside of the half-cut figure and that of the outside thereof at the voltage-applying time, and those at the non-voltage-applying time.

TABLE 3

| | Light transmittance (%) at electric-field-applying time | | Light transmittance (%) at non-electric-field-applying time | |
|---|---|---|---|---|
| | Inside | Outside | Inside | Outside |
| Example 3 | 49 | 1.0 | 1.1 | 1.0 |
| Example 4 | 48 | 1.1 | 1.0 | 1.1 |

INDUSTRIAL APPLICABILITY

About the light control film of the invention, the light transmittance of only a partial region thereof can be varied from that of the other region, or the light transmittance of a region thereof having a design such as a character or picture, can be varied from that of the other region.

DESCRIPTION OF REFERENCE NUMERALS 1 light control layer
2 resin matrix
3 droplets
4 transparent electroconductive resin substrates
5a transparent electroconductive films
5b transparent resin substrates
6 primer layers
7 power source
8 switch
9 dispersing medium
10 light control particles
11 incident light rays
12 transparent electroconductive film surfaces made naked by removing a light control layer
13 leads through which a voltage is applied to transparent electroconductive films

The invention claimed is:

1. A light control film, comprising: two transparent electroconductive resin substrates each having a transparent electroconductive film and a transparent resin substrate; and a light control layer sandwiched between the transparent electroconductive film sides of the two transparent electroconductive resin substrates,
    the light control layer being containing: a resin matrix; and a light control suspension dispersed in the resin matrix,
    wherein at least one of the two transparent electroconductive resin substrates has, on the transparent electroconductive film side thereof, a primer layer,
    the transparent electroconductive film and the transparent resin substrate of the at least one of the two transparent electroconductive resin substrates having the primer layer, are cut through a cutting line to have a shape of a picture or character,
    the cutting line is in a form that a start point for the cutting and an end point for the cutting make a closed region, and
    the closed region of the picture or character is electrically insulated from the transparent electroconductive film of the transparent electroconductive resin substrate around the shape of the picture or character.

2. The light control film according to claim 1, wherein the cutting line is made by use of a cutting plotter.

3. A light control film, comprising: two transparent electroconductive resin substrates each having a transparent electroconductive film and a transparent resin substrate; and a light control layer sandwiched between the transparent electroconductive film sides of the two transparent electroconductive resin substrates,
    the light control layer containing: a resin matrix; and a light control suspension dispersed in the resin matrix,
    wherein at least one of the two transparent electroconductive resin substrates has, on the transparent electroconductive film side thereof, a primer layer,
    the transparent electroconductive film and the primer layer of the one transparent electroconductive resin substrate having the primer layer, are cut through a cutting line to have a shape of a picture or character,
    the cutting line is in a form that a start point for the cutting and an end point for the cutting make a closed region, and
    the closed region of the picture or character is electrically insulated from the transparent electroconductive film of the transparent electroconductive resin substrate around the shape of the picture or character.

4. The light control film according to claim 3, wherein the cutting line is made by use of a cutting plotter.

* * * * *